(12) United States Patent
Ganapathy et al.

(10) Patent No.: US 6,832,306 B1
(45) Date of Patent: Dec. 14, 2004

(54) METHOD AND APPARATUS FOR A UNIFIED RISC/DSP PIPELINE CONTROLLER FOR BOTH REDUCED INSTRUCTION SET COMPUTER (RISC) CONTROL INSTRUCTIONS AND DIGITAL SIGNAL PROCESSING (DSP) INSTRUCTIONS

(75) Inventors: Kumar Ganapathy, Mountain View, CA (US); Ruban Kanapathipillai, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 09/652,593

(22) Filed: Aug. 30, 2000

Related U.S. Application Data

(63) Continuation-in-part of application No. 09/427,174, filed on Oct. 25, 1999, now Pat. No. 6,330,660, and a continuation-in-part of application No. 09/494,609, filed on Jan. 31, 2000, now Pat. No. 6,598,155.

(51) Int. Cl.⁷ ............ G06F 15/16; G06F 9/44; G06F 13/40
(52) U.S. Cl. ............ 712/41; 712/35; 712/36; 712/43
(58) Field of Search .......... 712/41, 42, 43, 712/35, 36, 34, 221, 223, 225, 213, 207, 241, 219; 708/135; 717/160; 704/200

(56) References Cited

U.S. PATENT DOCUMENTS

| | | | |
|---|---|---|---|
| 4,969,118 | A | 11/1990 | Montoye et al. |
| 5,142,677 | A | 8/1992 | Ehlig et al. |
| 5,241,492 | A | 8/1993 | Girardeau, Jr. |
| 5,341,374 | A | 8/1994 | Lewen et al. |

(List continued on next page.)

OTHER PUBLICATIONS

D. Patterson & J. Hennessy, Computer Architecture A Quantitative Approach, Morgan Kaufmann Publishers, Inc., San Mateo, CA 1990, pp. 142–143.

J. Mick & J. Brick, Bit–Slice Microprocessor Design, McGraw–Hill Book Company, 1990, p. 191.

R. Kain, Advanced Computer Architecture, A Systems Design Approach, Department of Electrical Engineering, University of Minnesota, Prentice Hall, NJ, pp. 16–17.

J. Cavanagh, Digital Computer Arithmetic, Design and Implementation, McGraw–Hill Book Company, 1984, pp. 1–12.

D. Minoli & E. Minoli, Delivering Voice Over IP Networks, John Wiley & Sons, Inc., 1998, pp. 149–233.

R65C00/21 Dual CMOS Microcomputer and R65C29 Dual CMOS Microprocessor; Rockwell 1984 Data Book; Rockwell International; Document No. 29651N64; pp. 3–1.

(List continued on next page.)

Primary Examiner—Daniel H. Pan
(74) Attorney, Agent, or Firm—Alan Pedersen-Giles

(57) ABSTRACT

Disclosed is a method and apparatus for a unified RISC/DSP pipeline controller to control the execution of both reduced instruction set computer (RISC) control instructions and digital signal processing (DSP) instructions for a signal processor. The unified RISC/DSP pipeline controller is coupled to a program memory, a RISC control unit, and at least one signal processing unit. The program memory stores both DSP and RISC control instructions and the RISC control-unit controls the flow of operands and results between the signal processing unit and a data memory that stores data. The signal processing unit executes the DSP instruction. The unified RISC/DSP pipeline controller generates DSP control signals to control the execution of the DSP instruction by the signal processing unit and RISC control signals to control the execution of the RISC control instruction by the RISC control unit.

39 Claims, 18 Drawing Sheets

U.S. PATENT DOCUMENTS

| | | | | |
|---|---|---|---|---|
| 5,384,890 A | * | 1/1995 | Anderson et al. | 704/200 |
| 5,499,272 A | | 3/1996 | Bottomley | |
| 5,530,663 A | | 6/1996 | Garcia et al. | |
| 5,541,917 A | | 7/1996 | Farris | |
| 5,546,333 A | * | 8/1996 | Smith | 708/135 |
| 5,559,793 A | | 9/1996 | Maritra et al. | |
| 5,574,927 A | | 11/1996 | Scantlin | |
| 5,638,524 A | * | 6/1997 | Kiuchi et al. | 712/221 |
| 5,727,194 A | | 3/1998 | Shridhar et al. | |
| 5,748,977 A | | 5/1998 | Kawasaki et al. | |
| 5,761,470 A | | 6/1998 | Yoshida | |
| 5,822,613 A | | 10/1998 | Takaki et al. | |
| 5,825,685 A | | 10/1998 | Yamane et al. | |
| 5,826,072 A | | 10/1998 | Knapp et al. | |
| 5,838,931 A | | 11/1998 | Regenold et al. | |
| 5,880,984 A | | 3/1999 | Burchfiel et al. | |
| 5,881,060 A | | 3/1999 | Morrow et al. | |
| 5,901,301 A | | 5/1999 | Matsuo et al. | |
| 5,923,871 A | | 7/1999 | Gorshtein et al. | |
| 5,940,785 A | | 8/1999 | Gorgiou et al. | |
| 5,970,094 A | | 10/1999 | Lee | |
| 5,983,253 A | | 11/1999 | Fischer et al. | |
| 5,995,122 A | | 11/1999 | Hsieh et al. | |
| 6,029,267 A | | 2/2000 | Simanapalli et al. | |
| 6,058,408 A | | 5/2000 | Fischer et al. | |
| 6,138,136 A | | 10/2000 | Bauer et al. | |
| 6,154,828 A | | 11/2000 | Macri et al. | |
| 6,330,660 B1 | | 12/2001 | Ganapathy et al. | |
| 6,367,071 B1 | * | 4/2002 | Cao et al. | 717/160 |

OTHER PUBLICATIONS

Computer Organization and Architecture 4th Edition.
Instruction Set Architecture Simulation Infrastructure and Application Development.
Supporting Predicated Exectuion: Techniques and Tradeoffs.
Instruction Set Architecture, Web Based Course.
Minoli & Minoli; Chapter 5, Technology and Standards for Low–Bit–Rate Vocoding Methods; Delivering Voice over IP Networks; 1998; pp. 149–233; Robert Ipsen Pub.
Texas Instruments SMJ320C80 Digital Signal Processor Data Sheet; Document No. SGUS025; Aug. 1998; Texas Instruments.

* cited by examiner

| 610 | |
|---|---|
| 611 | 612 |
| MAIN OP | SUB OP |
| MULT | NOP |
| ADD | MIN/MAX |
| MIN/MAX | ADD |
| NOP | MULT |

| 20-bit ISA | 39 | 19 | | |
|---|---|---|---|---|
| | 0 | 0 | 20-bit parallel | Control ∥ Control |
| | 0 | 1 | 20-bit serial | Control # Control |
| | 1 | 0 | 40-bit extended | DSP, extensions/Shadow |
| | 1 | 1 | 20-bit serial | DSP # DSP |

6-bit operand specifier:
A 6-bit specifier is used in DSP extended instructions to access memory and register operands.

| 5 | 4 | 3 | 2 | 1 | 0 | | |
|---|---|---|---|---|---|---|---|
| M/R | | | | | | | |
| 0 | 0 | ac-page | | | | ereg | |
| 0 | 1 | gpr.r0–r15 | | | | GPR | |
| 1 | ptr:(r0)to(r15) | | | | off | Mem[ptr{0-15}]Π ptr.[0-15] ⟶ =offset1/offset2 | Always postupdate |

This allows access to data memory, ereg and GPR

- Bit 5=1: Use rX(X:0-7) register to obtain effective memory address and post-modify the ptr field by one of two possible offsets specified in rX registers.
  dmem[ptr], ptr=ptr+offset1, if off=0
  ptr=ptr+offset2, if off=1
- Bit 5=0: Access ac-page or GPR If Bit-4 is set to 0, then bits 3:0 control access to the general-purpose register file (r0-15) or to execution unit registers.

| GPR | GPR Intr page | ac-page | ac intr page | ereg-Shadow DSP |
|---|---|---|---|---|
| R0 | R0 | A0 | A0_i | A0 |
| R1 | R1 | A1 | A1_i | A1 |
| R2 | R2 | T | T | T |
| R3 | R3 | TR | TR | TR |
| R4 | R4 | | | |
| R5 | R5 | | | |
| R6 | R6 | | | |
| R7 | R7 | | | |
| R8 | R8 | | | SX1 |
| R9 | R9 | | | SX1s |
| R10 | R10 | | | SX2 |
| R11 | R11 | | | SX2s |
| R12 | R12_i | | | SY1 |
| R13 | R13_i | | | SY1s |
| R14 | R14_i | | | SY2 |
| R15 | R15_i | | | SY2s |

FIG. 6C

4-bit operand specifier:

Memory operands: (rX) specifies an access out of the data memory to the execution unit for the function that needs to be performed. The address for the access is specified in the rX register in the general register file that hold the 14-bit pointer (16K of addressing) to memory, 5-bit signed offset or a 3-bit unsigned offset that can post-modify the address. In addition each pointer is typed for efficient SIMD processing and includes a permute control for rearranging data elements of a vector on the fly. The "podi" core can deal with 4-element 16-bit real vectors or complex data directly. This ability to manipulate memory data directly reduces the instruction width greatly and allows efficient signal processing.

(rX): Memory Address Registers

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|----|----|---|---|---|---|---|---|---|---|---|---|
| type | | | cb | x | permute | | | | | off1:(0-7) | | | off0:(-16 to 15) | | | | | ptr: pointer | | | | | | | | | | | | | |

FIG. 6D

5-bit operand specifier:

The 5-bit specifier includes the 4-bit specifier for general data operands and the special purpose registers. It is used in RISC instructions.

| 4 | 3 | 2 | 1 | 0 |
|---|---|---|---|---|
| 0 | spr:s0–s15 | | | |
| 1 | gpr:r0–r15 | | | |

|    | SPR<br>SPR | Intr page<br>SPR intr page |           |
|----|------------|----------------------------|-----------|
| 0  | fu–ctl     | fu–ctl_I                   |           |
| 1  | a–type     | a–type_I                   |           |
| 2  | ps–ctl     | ps–ctl                     |           |
| 3  | t–type     | t–type                     |           |
| 4  | pl–ctl     | pl–ctl                     |           |
| 5  | cb–ctl     | cb–ctl_I                   |           |
| 6  | shuffle    | shuffle                    |           |
| 7  | lo–ptr     | lo–ptr                     |           |
| 8  | status     | status_I                   |           |
| 9  | loop–ctl   | loop–ctl                   |           |
| 10 | pcr        | pcr                        | stack(8)  |
| 11 | reserved   | reserved                   |           |
| 12 | reserved   | reserved                   |           |
| 13 | reserved   | reserved                   |           |
| 14 | reserved   | reserved                   |           |

NOTE: All SPR registers are reset to all zeros at power on reset except for the PCR register.

FIG. 6E

DSP Instructions

| | 39 | 38 | 37 | 36 | 35 | 34 | 33 | 32 | 31 | 30 | 29 | 28 | 27 | 26 | 25 | 24 | 23 | 22 | 21 | 20 | |
|---|---|---|---|---|---|---|---|---|---|---|---|---|---|---|---|---|---|---|---|---|---|
| Multiply | 1 | 0 | 0 | PS | | S' | SX | | | | SY | | | | V/S | SA | DA | Sub-op | | | |
| da=sx*sy | | | | | | | | | | | | | | | | | | 0 | 0 | 0 | Nop |
| da=(sx*sy)+sa | | | | | | | | | | | | | | | | | | 0 | 0 | 1 | Add |
| da=(sx*sa)+sy | | | | | | | | | | | | | | | | | | 0 | 1 | 0 | Add |
| da=(sx*sy)+sa | | | | | | | | | | | | | | | | | | 0 | 1 | 1 | Sub |
| da=(sx*sa)+sy | | | | | | | | | | | | | | | | | | 1 | 0 | 0 | Sub |
| da=min(sx*sy,sa) | | | | | | | | | | | | | | | | | | 1 | 0 | 1 | Min |
| da=min(sx*sa,sy) | | | | | | | | | | | | | | | | | | 1 | 1 | 0 | Min |
| da=max(sx*sy,sa) | | | | | | | | | | | | | | | | | | 1 | 1 | 1 | Max |
| Add | 1 | 0 | 1 | PS | | +/- | SX | | | | SY | | | | V/S | SA | DA | Sub-op | | | |
| da=sx+sy | | | | | | | | | | | | | | | | | | 0 | 0 | 0 | Nop |
| da=sx+sy+sa | | | | | | | | | | | | | | | | | | 0 | 0 | 1 | Add |
| da=sx+sy: sa=sx+sy: | | | | | | | | | | | | | | | | | | 0 | 1 | 0 | AddSub |
| da=(sx+sy)*sa | | | | | | | | | | | | | | | | | | 0 | 1 | 1 | Mul |
| da=-(sx+sy)*sa | | | | | | | | | | | | | | | | | | 1 | 0 | 0 | MulN |
| da=min(sx+sy,sa) | | | | | | | | | | | | | | | | | | 1 | 0 | 1 | Min |
| da=max(sx+sy,sa) | | | | | | | | | | | | | | | | | | 1 | 1 | 0 | Max |
| da=ssum(sa) (sx,sy unused) | | | | | | | | | | | | | | | | | | 1 | 1 | 1 | CombAdd |
| Extremum | 1 | 1 | 0 | PS | | x/n | SX | | | | SY | | | | V/S | SA | DA | Sub-op | | | |
| da=ext(sx,sy) | | | | | | | | | | | | | | | | | | 0 | 0 | 0 | Nop |
| da=ext(sx,sy,sa) | | | | | | | | | | | | | | | | | | 0 | 0 | 1 | Ext |
| da=ext(sx,sa)*sy | | | | | | | | | | | | | | | | | | 0 | 1 | 0 | Mul |
| da=-ext(sx,sa)*sy | | | | | | | | | | | | | | | | | | 0 | 1 | 1 | MulN |
| da=ext(sx,sa)+sy | | | | | | | | | | | | | | | | | | 1 | 0 | 0 | Add |
| da=ext(sx,sa)-sy | | | | | | | | | | | | | | | | | | 1 | 0 | 1 | Sub |
| ext(sa,da) ?1=sx,tr=sy,lcs=lc | | | | | | | | | | | | | | | | | | 1 | 1 | 0 | amax |
| type-match | 1 | 1 | 0 | PS | | 0 | SX | | | | SY | | | | x | x | x | 1 | 1 | 1 | |
| | 1 | 1 | 0 | PS | | 0 | x | x | x | x | x | x | x | x | x | x | x | 1 | 1 | 1 | |
| Permute | 1 | 1 | 0 | PS | | 1 | Type | | | | SY | | | | 0 | ereg | | 1 | 1 | 1 | Permute |
| Reserved | 1 | 1 | 1 | PS | | X | SX | | | | SY | | | | SA | DA | V/S | Sub-op | | | |

FIG. 6G

Control and specifier Extensions

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|

Mul

| 0 | Pred | PL | Sxt | Syt | Rnd | Lt | S' | S' | S' | 0 | SA | DA | obs | 0 | 0 |

Add

| 0 | Pred | PL | Sxt | Syt | Lt | Sub-ext | 0 | SA | DA | obs | 0 | 0 |

|  | +/- | +/- | +/- | x |  |
|  | x | V/S | Rnd | Fp |  |
|  | tr/ctl | Gx | Fp |  |  |

Nop (uadd)
Mul/MulN
Min/Max

Ext

| 0 | Pred | PL | Sxt | Syt | tr-ctl | Gx | Sub-ext | 0 | SA | DA | obs | 0 | 0 |

|  | Lt | Fp |
|  | Rnd | V/S |

Add/sub
Mul

| 0 | Pred | PL | Sxt | Syt | Pctl1 | 0 | ereg | Pcll | 0 | 0 |

Type/offset/permute extensions

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|

| 0 | Pred | PL | x | Type:SX | Type:SY | 0 | SA | DA | x | 0 | 1 | Type override |
| 0 | Pred | PL | Psx | Permute:SX | Permute:SY | 0 | SA | DA | Psy | 1 | 0 | permute override |
| 0 | Pred | I/R | I/R | prX | Offset:SX | Offset:SY | 0 | SA | DA | prY | 1 | 1 | Offset override |

Shadow DSP

| 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|---|---|---|---|---|---|---|---|---|---|

| 0 | Op | PL | op | SA | ereg1 | DA | ereg2 | 1 | SA | DA | Sub-op |

| 1 | 1 | 0 | PL | 0 | x | x | x | Rnd | x | x | x | x | 0 | SA | DA | 1 | 1 | 1 |

FIG. 6H

Control instructions

| | | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|
| add,sub | L | Pred | | | 0 | 0 | 0 | | RX | | | | RY | | | | RZ | | | +/- | 0 | |
| max,min | L | Pred | | | 0 | 0 | 0 | | RX | | | | RY | | | | RZ | | | X/N | 1 | |
| Shift | L | Pred | | | 0 | 0 | 1 | | RX | | | | UI4 | | | | RZ | | UI2 | R/L | <Bit1,Bits9−6> |
| Logic | L | Pred | | | 0 | 1 | 0 | | RX | | | | RY | | | | RZ | | | &, | &1 | ==UI5 (Shift |
| Mux | L | Pred | | | 0 | 1 | 1 | | RX | | | | RY | | | | RZ | | Pd | 0 | Amount) |
| mov | L | Pred | | | 0 | 1 | 1 | | RX | | | | DZ | | Rxt | Dzl | 0 | 0 | 0 | 1 | |
| addi | L | Pred | | | 0 | 1 | 1 | | SI4 | | | | DZ | | x | x | 1 | 0 | 0 | 1 | |
| mov2erg | L | Pred | | | 0 | 1 | 1 | | RX | | unit | | ereq | | qd | | type | 1 | 0 | 1 | |
| l.dm | L | Pred | | | 0 | 1 | 1 | | RX | | | | DZ1 | | | | DZ2 | | 1 | 1 | |
| Set4bits | L | Pred | | | 1 | 0 | 0 | | UI4:POS | | | | RZ | | Rzt | | | UI4 | | 0 | |
| Set2bits | L | Pred | | | 1 | 0 | 0 | | UI4:POS | | | | RZ | | Rzt | UI2 | 0 | 0 | 1 | |
| Setbit | L | Pred | | | 1 | 0 | 0 | | UI4:POS | | | | RZ | | Rzt | UI1 | UI1 | 1 | 0 | 1 | <Bit3,Bits13− |
| Movi | L | Pred | | | 1 | 0 | 0 | | SI8 | | | | | | | | RZ | | | 1 | 1 | 10>==UI5 POS |
| Jmp | L | Pred | | | 1 | 0 | 1 | | SI9 | | | | | | | 0 | PRED | | 0 | 0 | |
| Call | L | Pred | | | 1 | 0 | 1 | | SI9 | | | | | | | 1 | PRED | | 0 | 0 | |
| Loop | L | Pred | | | 1 | 0 | 1 | | UI5:Lcount | | | | UI5:Lsize | | | | UI2:Lst | | 0 | 1 | |
| Jmpi | L | Pred | | | 1 | 0 | 1 | | RX | | x | x | x | x | x | 0 | PRED | | 1 | 0 | |
| Calli | L | Pred | | | 1 | 0 | 1 | | RX | | x | x | x | x | x | 1 | PRED | | 1 | 1 | |
| Loopi | L | Pred | | | 1 | 0 | 1 | | RX | | x | | UI5:Lsize | | | | UI2:Lst | | 1 | 1 | |
| Test | L | Pred | | | 1 | 1 | 0 | | RX | | | | RY | | | | PZ | | =,<,> | 0 | |
| Testbit | L | Pred | | | 1 | 1 | 0 | | RX | | | | UI5 | | | | PZ | | B | 0 | 1 |
| Andp, orp | L | Pred | | | 1 | 1 | 0 | | Pa | | Pb | | Pc | | | | PZ | | & | 1 | 1 |
| Load | L | Pred | | | 1 | 1 | 1 | | MX | | | | RZ | | | | Ext | | 0 | 0 | 0 |
| Store | L | Pred | | | 1 | 1 | 1 | | MZ | | | | RZ | | | | Ext | | 1 | 0 | 0 |
| eLoad | L | Pred | | | 1 | 1 | 1 | | MX | | | | RY | | 1 | 1 | 1 | 0 | 0 | 0 | |
| eStore | L | Pred | | | 1 | 1 | 1 | | MZ | | | | RY | | 1 | 1 | 1 | 1 | 0 | 0 | |
| Extended | L | Pred | | | 1 | 1 | 1 | | Bits 27:16 | | | | | | | | | | 1 | 0 | |
| Logic2 | L | Pred | | | 1 | 1 | 1 | | RX | | | | RY/RZ | | Rxt | Ryt | &,1,&1,! | | 0 | 1 | |
| mov-erg | L | Pred | | | 1 | 1 | 1 | | unit | | ereq | | RZ | | qd | | Sft | | 0 | 1 | 1 |
| Crb | L | Pred | | | 1 | 1 | 1 | | RX | | | | RZ | | s/m | 0 | 0 | 1 | 1 | 1 | |
| Ponty | L | Pred | | | 1 | 1 | 1 | | RX | | | | PZ | | 0/E | 0 | 1 | 0 | 1 | 1 | 1 |
| Stm | L | Pred | | | 1 | 1 | 1 | | MZ | | | | RX | | | 1 | 1 | 0 | 1 | 1 | 1 |
| Abs | L | Pred | | | 1 | 1 | 1 | | RX | | | | RZ | | 0 | 0 | 1 | 1 | 1 | 1 | |
| Neg | L | Pred | | | 1 | 1 | 1 | | RX | | | | RZ | | 0 | 1 | 1 | 1 | 1 | 1 | |
| Div-step | L | Pred | | | 1 | 1 | 1 | | RX | | | | RZ | | 1 | 0 | 1 | 1 | 1 | 1 | |
| Test&Set | L | Pred | | | 1 | 1 | 1 | | RX | | | | PZ | | 0 | 1 | 1 | 1 | 1 | 1 | |
| Reserved | L | Pred | | | 1 | 1 | 1 | | | | | | 0 | 0 | 1 | 1 | 1 | 1 | 1 | 1 | |
| Return | L | Pred | | | 1 | 1 | 1 | | Pred | | I-ctl | | 0 | 1 | 0 | 1 | 1 | 1 | 1 | 1 | |
| Zero-oc | L | Pred | | | 1 | 1 | 1 | | oc # | | | | 1 | 1 | 0 | 1 | 1 | 1 | 1 | 1 | |
| eSync | L | Pred | | | 1 | 1 | 1 | | RZ | | | | 0 | 1 | 1 | 1 | 1 | 1 | 1 | 1 | |
| Swi | L | Pred | | | 1 | 1 | 1 | | UI3 | | 0 | 1 | 1 | 1 | 1 | 1 | 1 | 1 | 1 | 1 | |
| Nop | L | Pred | | | 1 | 1 | 1 | | UI3 | | 1 | 1 | 1 | 1 | 1 | 1 | 1 | 1 | 1 | 1 | |

Extended Control

| | Bits 13:2 of upper half (39:20) | | | | | | | | | | | | Bits 19:10 | | | | | | | | | | | |
|---|---|---|---|---|---|---|---|---|---|---|---|---|---|---|---|---|---|---|---|---|---|---|---|---|---|
| | 13 | 12 | 11 | 10 | 9 | 8 | 7 | 6 | 5 | 4 | 3 | 2 | 19 | 18 | 17 | 16 | 15 | 14 | 13 | 12 | 11 | 10 | 9 8 7 | 6 5 | 4 3 | 2 1 0 |
| Insert/Extract | RX | | | | RZ | | | 0 | 0 | 0 | 0 | 0 | 0 | x | x | 0 | Rxt | Rzt | I/E | R/L | Offset:UI5 | | Length:UI5 | | 0 |
| Insert Shift | UI4 length | | | | RZ | | | 0 | 0 | 0 | 1 | 0 | 0 | x | x | 0 | Rzt | UI5 Position | | | | | Imm10 | | RV x |
| | RX | | | | RY | | | 0 | 0 | 1 | 1 | 0 | 0 | x | rxl | 0 | rzh rzt | D | U/S | Shift UI5 | | | A/L Lt R/L 0 Fill | | 1 | Fill: Sign/Zero |
| Rotate | RX | | | | RY | | | 0 | 0 | 1 | 0 | 0 | 0 | x | x | 0 | x | x | 0 rxh | | Shift UI5 | | RY | | 1 x R/L 1 x | 1 |
| jmp, call | UI7 | | | J/C | | | 0 | 1 | 1 | 0 | 0 | 0 | Pred | x | x | 0 | UI1 | UI4 outer Lsize UI2 C-Ls UI4 inner Lstart | | | | | | 0 | Bit 15 is continuation of inner LC |
| dloop | UI4 outer LC | | | UI4 inner | | | | 0 | 1 | 1 | 0 | 0 | 0 | x | exit | 0 | x | UI4 outer Lsize UI2 C-Ls UI4 inner Lstart | | | | | | 1 |
| dloopi | RX | | | RY | | | | 0 | 0 | 1 | 1 | 0 | 0 | x | x | 0 | 0 | rxh md | rzl | i/f | rzh rzl s/u | | RZ | | 0 |
| mult | RX | | | RY | | | | 0 | 1 | 0 | 1 | 0 | 0 | x | x | 0 | 0 | rxh rxl | rxh rzl +/- | Lt | rzh rzl x | | RZ | | x |
| add/sub | RX | | | | RY | | | 0 | 0 | 1 | 1 | 0 | 0 | x | x | 0 | 1 | rxh rxl rxh rzl +/- | | x | x | | RY | | x |
| Reserved | | | | | | | | 0 | 1 | 0 | 1 | 0 | 0 | x | x | 0 | | | | x | x | | | | 0 |
| logicp | RX | | | PZ | | | D | 1 | 1 | 1 | 0 | 0 | 0 | x | x | 0 | T/F FT/F &i | | PY | | | | | 1 | andp,orp, andorp, orandp, pz=(px relop py) |
| Testi | RX | | | PZ | | | D | 1 | 0 | 1 | 0 | 0 | 0 | =>< | x | 0 | &i | | | Imm16 | | | | | x | relop pv |
| Movi | H/L | | | RZ | | | | 1 | 0 | 0 | 1 | 0 | 0 | x | x | 0 | | | | Imm16 | | | | | 0 |
| loadi | type | | | RZ | | | | 0 | 1 | 0 | 1 | 0 | 0 | x | x | 0 | 0 | 0 | | | Imm14 | | | SI10 | 0 |
| storei | type | | | RX | | | | 1 | 1 | 0 | 1 | 0 | 0 | x | x | 0 | 0 | 1 | | | Imm14 | | | SI10 | 0 |
| loadt | RX | | | RZ | | | | 0 | 0 | 1 | 1 | 1 | 0 | x | x | 0 | Rzt | 0 | Type | | Imm16 | | | | 0 |
| storet | M7 | | | RX | | | | 0 | 1 | 1 | 1 | 1 | 0 | x | x | 0 | Rzt | 1 | Type | | | | | | 0 |
| Addi,subi | RX | | | RZ | | | | 1 | 0 | 0 | 1 | 1 | 0 | L1 s/u 0 +/- | | 0 | | | | Imm16 | | | | | 0 |
| mini,maxi | RX | | | RZ | | | | 1 | 1 | 0 | 1 | 1 | 0 | x | 0 | X/N 1 | | | | Imm16 | | | | | 0 |
| andi,on | RX | | | RZ | | | | 1 | 1 | 1 | 1 | 1 | 0 | &i H/L | | 0 | | | | Imm16 | | | | | 0 |

Shift:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|---|---|---|---|---|---|---|---|
| Group | | Pred | | | opcode | | | | | SX | | | DZ | | | | Amount | | | | | | | | | PL | PS | Lt | Rot | Fill | A/L | 1 | 1 | Shift |
| Group | | Pred | | | opcode | | | | | SX | | | DZ | | | | Amount | | | | | | | | | Position | | | | | Length | | | I/E | 0 | 1 | Insert/extract |
| Group | | Pred | | Imm2 | | opcode | | | | | | DZ | | | | | | Imm14 | | | | | | | | | | | | | Length | | | | | 0 | Setbits |

Immediate:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| Group | op | opcode | | | DZ | | | | | SX | | | | | | | | Imm32 | | | | | | | | | | | | | | | | | | | | | |
| Group | | Pred | | | opcode | | | | | | | DZ | | | | | Subop | | | | | | | | | Imm16 | | | | | | | | | | | | | |

Subop:
- MOV
- ADD
- SUB
- MIN
- MAX
- AND
- OR

Test:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| Group | | Pred | | | opcode | | | | | SX | | | | | | | SY | | | | | | | | DPz | | | Subop | | | | | | | | | | | |

Branch:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| Group | | Pred | | | opcode | | | | | | | | | | | | | | Imm20 | | | | | | | | | | | | | | | | | | | | |

Misc:

METHOD AND APPARATUS FOR A UNIFIED RISC/DSP PIPELINE CONTROLLER FOR BOTH REDUCED INSTRUCTION SET COMPUTER (RISC) CONTROL INSTRUCTIONS AND DIGITAL SIGNAL PROCESSING (DSP) INSTRUCTIONS

CROSS REFERENCE TO RELATED APPLICATIONS

This application is a continuation-in-part application and claims the benefit of U.S. application Ser. No. 09/427,174, now U.S. Pat. No. 6,330,660, filed Oct. 25, 1999 by inventors Ganapathy et al, the disclosure of which prior application is hereby incorporated by reference, verbatim and with the same effect as though it were fully and completely set forth herein.

This application is also a continuation-in-part application and claims the benefit of U.S. application Ser. No. 09/494,609, now U.S. Pat. No. 6,598,155, filed Jan. 31, 2000 by inventors Ganapathy et al, the disclosure of which prior application is hereby incorporated by reference, verbatim and with the same effect as though it were fully and completely set forth herein.

FIELD OF THE INVENTION

This invention relates generally to digital signal processing devices. More particularly, the invention relates to instruction execution within digital signal processors.

BACKGROUND OF THE INVENTION

Single chip digital signal processing devices (DSP) are relatively well known. DSPs generally are distinguished from general purpose microprocessors in that DSPs typically support accelerated arithmetic operations by including a dedicated multiplier and accumulator (MAC) for performing multiplication of digital numbers. The instruction set for a typical DSP device usually includes a MAC instruction for performing multiplication of new operands and addition with a prior accumulated value stored within an accumulator register. A MAC instruction is typically the only instruction provided in prior art digital signal processors where two DSP operations, multiply followed by add, are performed by the execution of one instruction. However, when performing signal processing functions on data it is often desirable to perform other DSP operations in varying combinations.

An area where DSPs may be utilized is in telecommunication systems. One use of DSPs in telecommunication systems is digital filtering. In this case a DSP is typically programmed with instructions to implement some filter function in the digital or time domain. The mathematical algorithm for a typical finite impulse response (FIR) filter may look like the equation $Y_n = h_0 X_0 + h_1 X_1 + h_2 X_2 + \ldots + h_N X_N$ where $h_n$ are fixed filter coefficients numbering from 1 to N and $X_n$ are the data samples. The equation $Y_n$ may be evaluated by using a software program. However in some applications, it is necessary that the equation be evaluated as fast as possible. One way to do this is to perform the computations using hardware components such as a DSP device programmed to compute the equation $Y_n$. In order to further speed the process, it is desirable to vectorize the equation and distribute the computation amongst multiple DSPs such that the final result is obtained more quickly. The multiple DSPs operate in parallel to speed the computation process. In this case, the multiplication of terms is spread across the multipliers of the DSPs equally for simultaneous computations of terms. The adding of terms is similarly spread equally across the adders of the DSPs for simultaneous computations. In vectorized processing, the order of processing terms is unimportant since the combination is associative. If the processing order of the terms is altered, it has no effect on the final result expected in a vectorized processing of a function.

In typical micro processors, a MAC operation would require a multiply instruction and an add instruction to perform both multiplication and addition. To perform these two instructions would require two processing cycles. Additionally, a program written for the typical micro processor would require a larger program memory in order to store the extra instructions necessary to perform the MAC operation. In prior art DSP devices, if a DSP operation other than a MAC DSP instruction needs to be performed, the operation requires separate arithmetic instructions programmed into program memory. These separate arithmetic instructions in prior art DSPs similarly require increased program memory space and processing cycles to perform the operation when compared to a single MAC instruction. It is desirable to reduce the number of processing cycles when performing DSP operations. It is desirable to reduce program memory requirements as well.

DSPs are often programmed in a loop to continuously perform accelerated arithmetic functions including a MAC instruction using different operands. Often times, multiple arithmetic instructions are programmed in a loop to operate on the same data set. The same arithmetic instruction is often executed over and over in a loop using different operands. Additionally, each time one instruction is completed, another instruction is fetched from the program stored in memory during a fetch cycle. Fetch cycles require one or more cycle times to access a memory before instruction execution occurs. Because circuits change state during a fetch cycle, power is consumed and thus it is desirable to reduce the number of fetch cycles. Typically, approximately twenty percent of power consumption may be utilized in the set up and clean up operations of a loop in order to execute DSP instructions. Typically, the loop execution where signal processing of data is performed consumes approximately eighty percent of power consumption with a significant portion being due to instruction fetching. Additionally, because data sets that a DSP device processes are usually large, it is also desirable to speed instruction execution by avoiding frequent fetch cycles to memory.

Additionally, the quality of service over a telephone system often relates to the processing speed of signals. That is particularly the case when a DSP is to provide voice processing, such as voice compression, voice decompression, and echo cancellation for multiple channels. More recently, processing speed has become even more important because of the desire to transmit voice aggregated with data in a packetized form for communication over packetized networks. Delays in processing the packetized voice signal tend to result in the degradation of signal quality on receiving ends.

It is desirable to provide improved processing of voice and data signals to enhance the quality of voice and data communication over packetized networks. It is desirable to improve the efficiency of using computing resources when performing signal processing functions.

BRIEF SUMMARY OF THE INVENTION

Briefly, the present invention includes an apparatus, method, instruction set architecture, and system as described in the claims. Multiple application specific signal processor (ASSP) having the instruction set architecture of the present invention are provided within gateways in communication systems to provide improved voice and data communication over a packetized network. Each ASSP includes a serial interface, a buffer memory, and four core processors for each to simultaneously process multiple channels of voice or data. Each core processor preferably includes a reduced instruction set computer (RISC) processor and four signal processing units (SPs). Each SP includes multiple arithmetic blocks to simultaneously process multiple voice and data communication signal samples for communication over IP, ATM, Frame Relay or other packetized network. The four signal processing units can execute the digital signal processing algorithms in parallel. Each ASSP is flexible and can be programmed to perform many network functions or data/voice processing functions, including voice and data compression/decompression in telecommunications systems (such as CODECs) particularly packetized telecommunication networks, simply by altering the software program controlling the commands executed by the ASSP.

An instruction set architecture for the ASSP is tailored to digital signal processing applications including audio and speech processing such as compression/decompression and echo cancellation. The instruction set architecture implemented with the ASSP, is adapted to DSP algorithmic structures. This adaptation of the ISA of the present invention to DSP algorithmic structures balances the ease of implementation, processing efficiency, and programmability of DSP algorithms.

The instruction set architecture may be viewed as being two component parts, one (RISC ISA) corresponding to the RISC control unit and another (DSP ISA) to the DSP datapaths of the signal processing units. The RISC ISA is a register based architecture including 16-registers within the register file, while the DSP ISA is a memory based architecture with efficient digital signal processing instructions.

The instruction word for the ASSP can be 20 bits, or can be expanded to 40 bits. The 40-bit instruction word can be used to control two instructions to be executed in series or parallel, such as two RISC control instructions, extended DSP instructions, or two 20-bit DSP instructions. The instruction set architecture of the ASSP has four distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40-bit DSP instruction that extends the capabilities of a 20-bit dyadic DSP instruction by providing powerful bit manipulation.

These instructions are for accelerating calculations within the core processor of the type where D=[(A op1 B) op2 C] and each of "op1" and "op2" can be a multiply, add, extremum (min/max) or other primitive DSP class of operation on the three operands A, B, and C. The ISA of the ASSP which accelerates these calculations allows efficient chaining of different combinations of operations.

All DSP instructions of the instruction set architecture of the ASSP are dyadic DSP instructions to execute two operations in one instruction with one cycle throughput. A dyadic DSP instruction is a combination of two basic DSP operations in one instruction and includes a main DSP operation (MAIN OP) and a sub DSP operation (SUB OP). Generally, the instruction set architecture of the present invention can be generalized to combining any pair of basic DSP operations to provide very powerful dyadic instruction combinations. The DSP arithmetic instructions or operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode").

The present invention efficiently executes these dyadic DSP instructions by means of the instruction set architecture and the hardware architecture of the application specific signal processor. For example, the DSP instructions can process vector data or scalar data automatically using a single instruction and provide the appropriate vector or scalar output results.

In one embodiment of the present invention, a unified RISC/DSP pipeline controller controls the execution of both reduced instruction set computer (RISC) control instructions and digital signal processing (DSP) instructions within each core processor of the ASSP. The unified RISC/DSP pipeline controller is coupled to the program memory, the RISC control unit, and the four signal processing units (SPs). The program memory stores both DSP instructions and RISC control instructions and the RISC control unit controls the flow of operands and results between the signal processing unit and the data memory. The signal processing units execute the DSP instruction.

The unified RISC/DSP pipeline controller generates DSP control signals to control the execution of the DSP instruction by the signal processing units and RISC control signals to control the execution of the RISC control instruction by the RISC control unit. By utilizing a single unified RISC/DSP pipeline controller to control the execution of both RISC control instructions and DSP instructions, the hardware and power requirements are reduced for the signal processor resulting in increased operational efficiency.

This brief summary has been provided so that the nature of the invention may be understood quickly. A more complete understanding of the invention can be obtained by reference to the following detailed description of the preferred embodiment thereof in connection with the claims and the attached drawings.

BRIEF DESCRIPTIONS OF THE DRAWINGS

FIG. 6C lists a set of addressing instructions, and particularly shows a 6-bit operand specifier for the ISA, according to one embodiment of the present invention.

FIG. 6D shows an exemplary memory address register according to one embodiment of the present invention.

FIG. 6E illustrates an exemplary 5-bit operand specifier according to one embodiment of the invention.

Figures 6A, 6B, 6F:
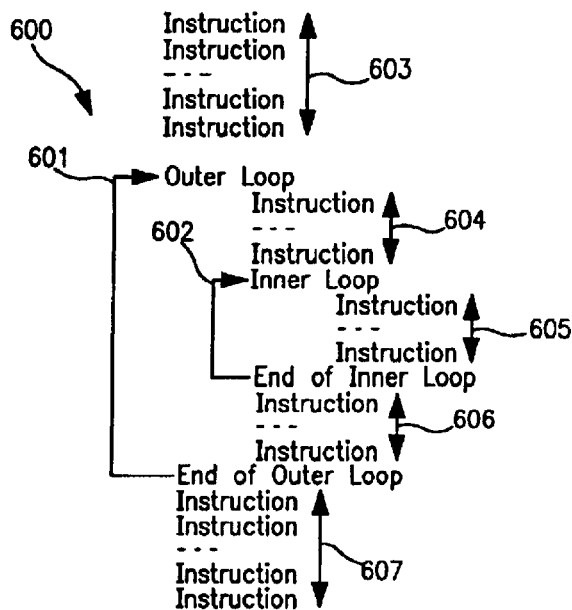
FIG. 6A is an exemplary instruction sequence illustrating a program model for DSP algorithms employing an instruction set architecture (ISA) according to one embodiment of the present invention.
FIG. 6B is a chart illustrating a pair of bits that specify differing types of dyadic DSP instructions and RISC control instructions of the ISA according to one embodiment of the present invention.

FIG. 6F is a chart illustrating the permutations of the dyadic DSP instructions according to one embodiment of the invention.

FIGS. 6G and 6H show a bitmap syntax for exemplary 20-bit non-extended DSP instructions and 40-bit extended DSP instructions according to one embodiment of the invention.

FIG. 6I illustrates RISC control instructions for the ISA according to one embodiment of the present invention.

FIG. 6J lists a set of extended RISC control instructions for the ISA according to one embodiment of the present invention.

Figures 6K1, 6K2:
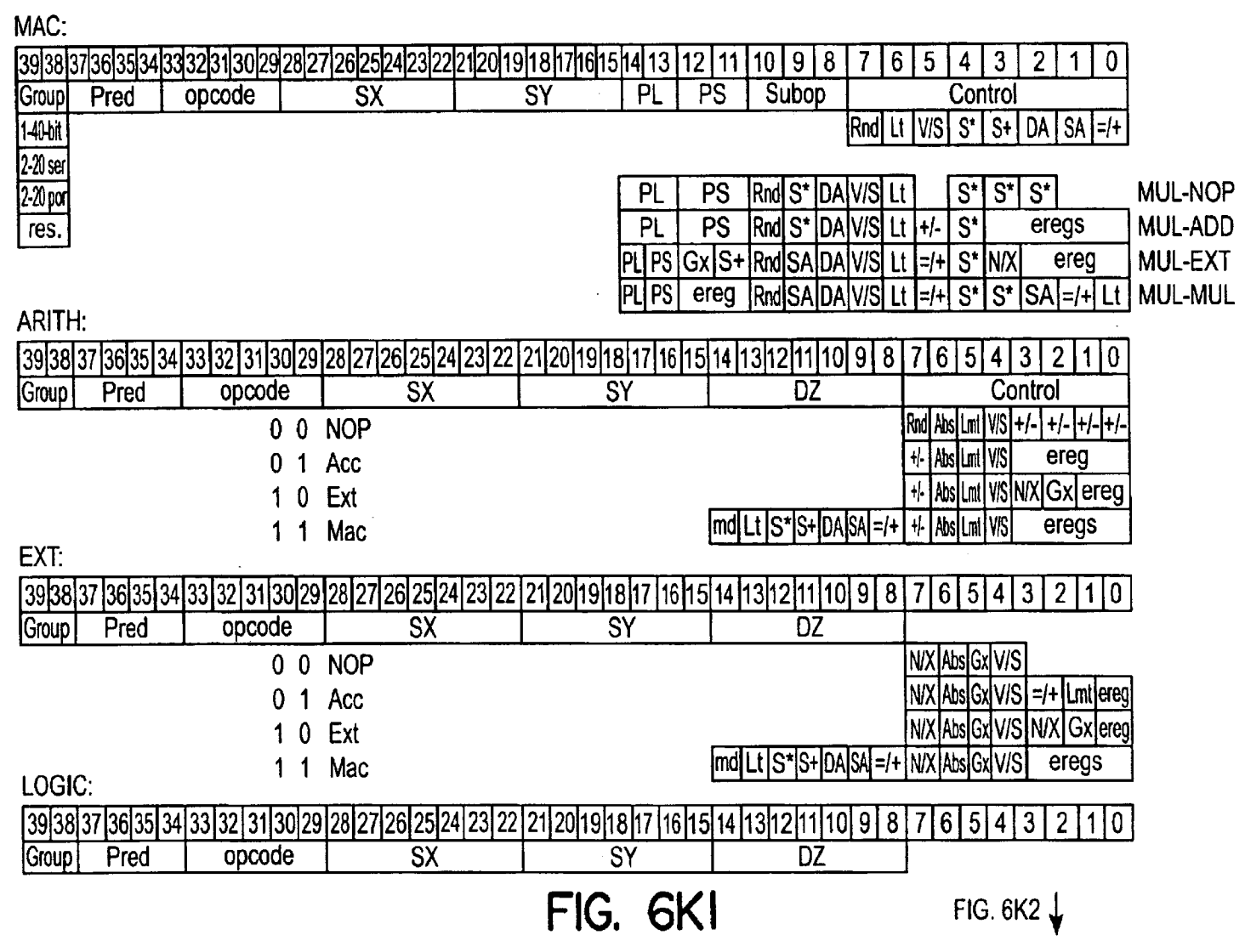

FIG. 6K lists a set of 40-bit DSP instructions for the ISA according to one embodiment of the present invention.

Figure 7:
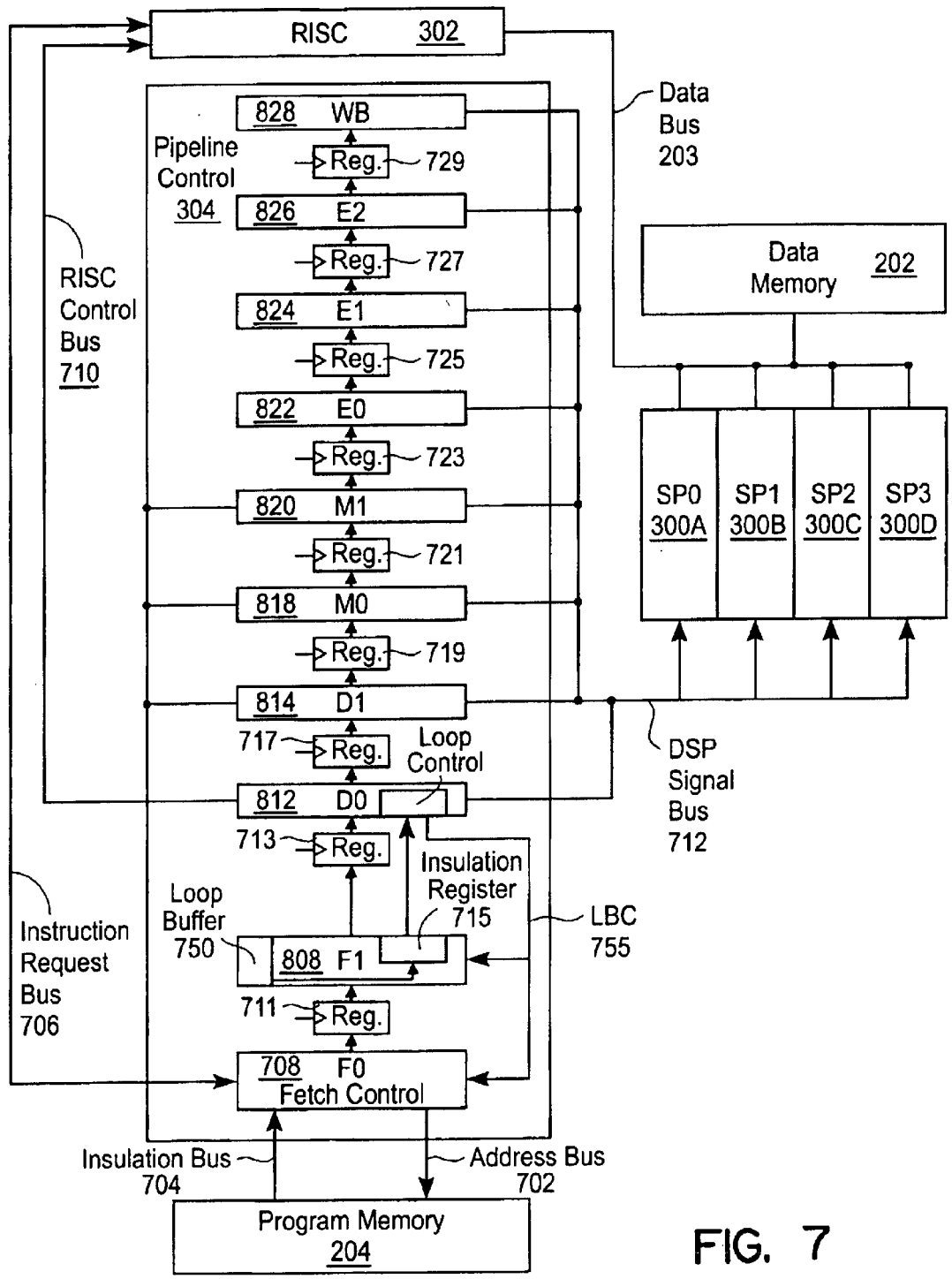

FIG. 7 is a functional block diagram illustrating an exemplary architecture for a unified RISC/DSP pipeline controller according to one embodiment of the present invention.

Figure 8A:
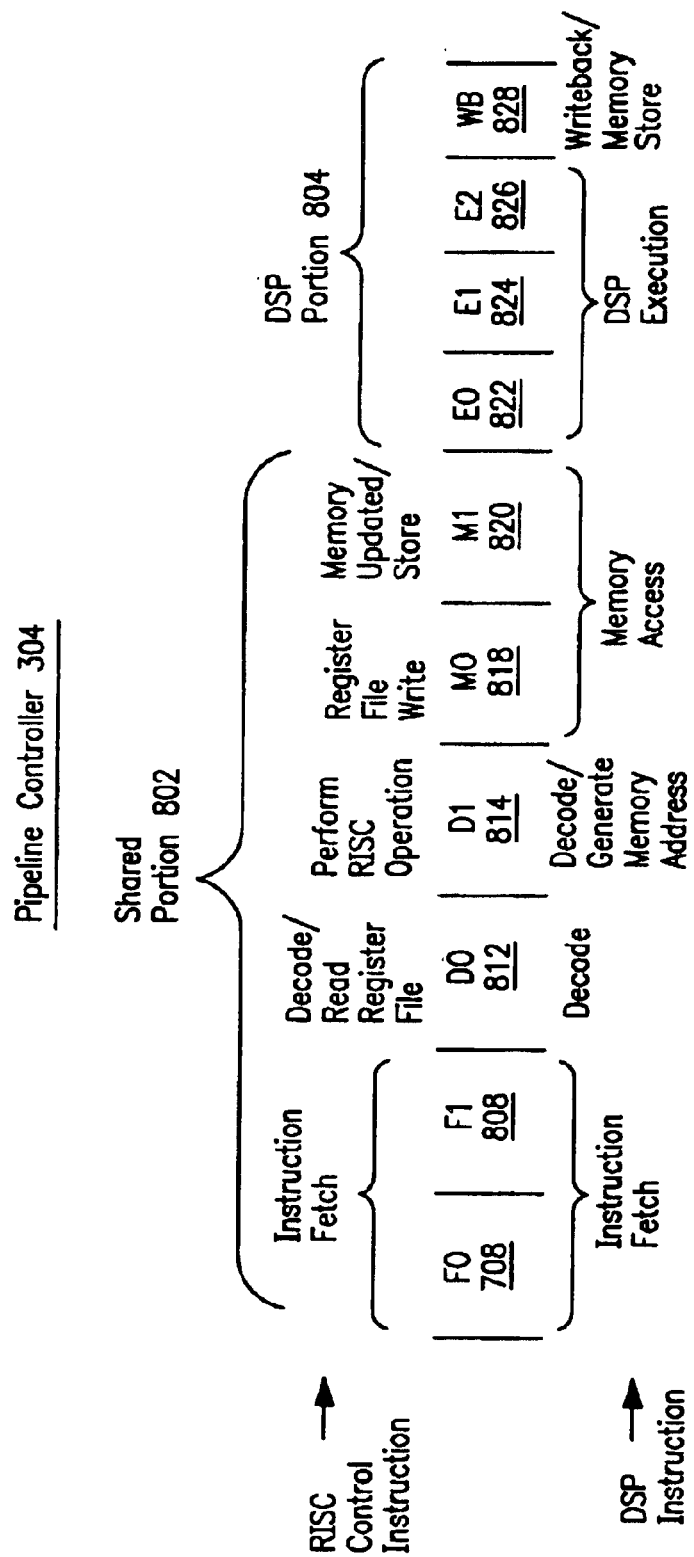

FIG. 8a is a diagram illustrating the operations occurring in different stages of the unified RISC/DSP pipeline controller according to one embodiment of the present invention.

Figure 8B:
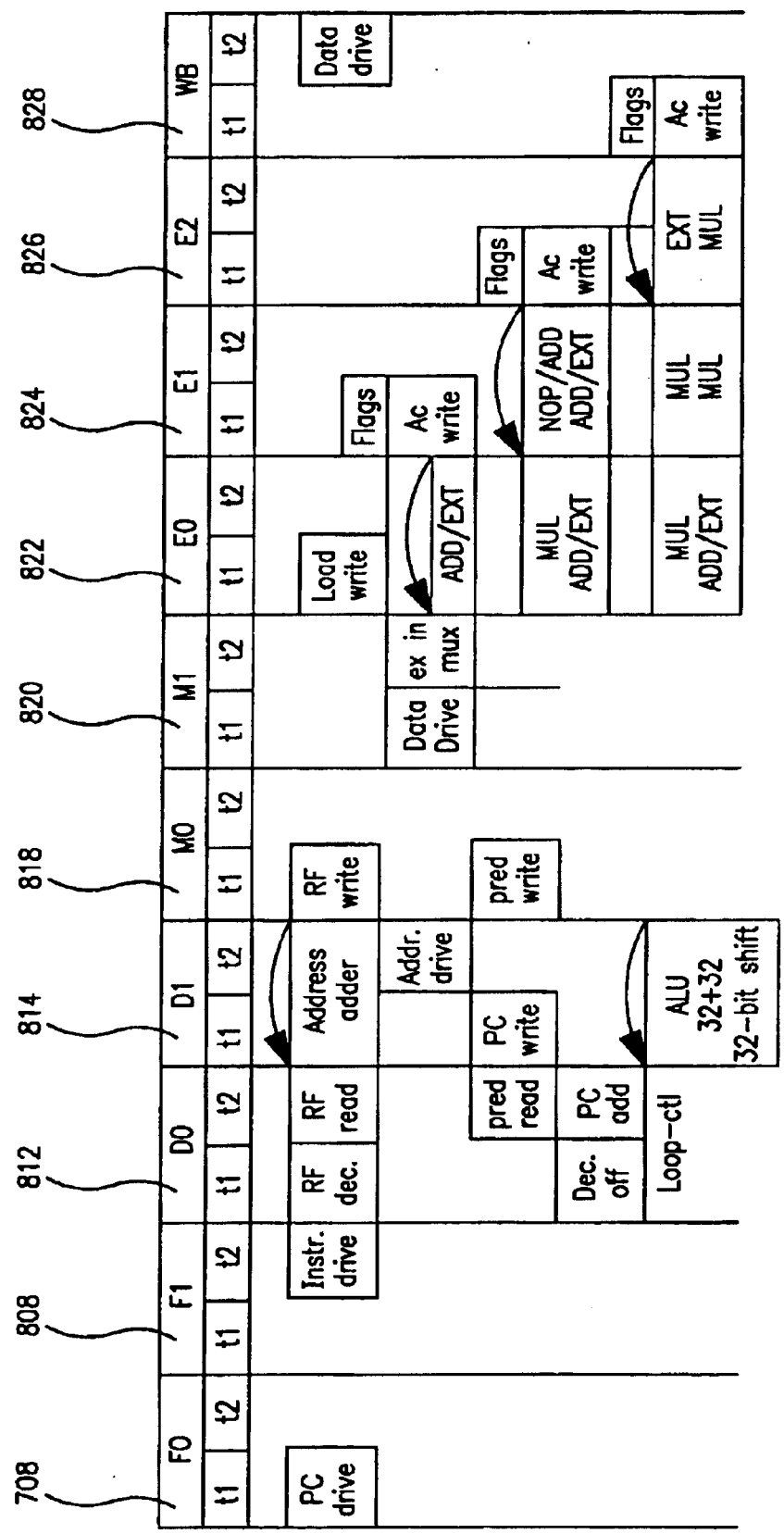

FIG. 8b is a diagram illustrating the timing of certain operations for the unified RISC/DSP pipeline controller of FIG. 8a according to one embodiment of the present invention.

Like reference numbers and designations in the drawings indicate like elements providing similar functionality. A letter after a reference designator number represents an instance of an element having the reference designator number.

DETAILED DESCRIPTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention. Furthermore, the present invention will be described in particular embodiments but may be implemented in hardware, software, firmware or a combination thereof Multiple application specific signal processors (ASSPs) having the instruction set architecture of the present invention are provided within gateways in communication systems to provide improved voice and data communication over a packetized network. Each ASSP includes a serial interface, a buffer memory and four core processors in order to simultaneously process multiple channels of voice or data. Each core processor preferably includes a reduced instruction set computer (RISC) processor and four signal processing units (SPs). Each SP includes multiple arithmetic blocks to simultaneously process multiple voice and data communication signal samples for communication over IP, ATM, Frame Relay, or other packetized network. The four signal processing units can execute digital signal processing algorithms in parallel. Each ASSP is flexible and can be programmed to perform many network functions or data/voice processing functions, including voice and data compression/decompression in telecommunication systems (such as CODECs), particularly packetized telecommunication networks, simply by altering the software program controlling the commands executed by the ASSP.

An instruction set architecture for the ASSP is tailored to digital signal processing applications including audio and speech processing such as compression/decompression and echo cancellation. The instruction set architecture implemented with the ASSP, is adapted to DSP algorithmic structures. This adaptation of the ISA of the present invention to DSP algorithmic structures balances the ease of implementation, processing efficiency, and programmability of DSP algorithms. The instruction set architecture may be viewed as being two component parts, one (RISC ISA) corresponding to the RISC control unit and another (DSP ISA) to the DSP datapaths of the signal processing units. The RISC ISA is a register based architecture including 16-registers within the register file, while the DSP ISA is a memory based architecture with efficient digital signal processing instructions.

The instruction word for the ASSP can be 20 bits, or can be expanded to 40 bits. The 40-bit instruction word can be used to control two instructions to be executed in series or parallel, such as two RISC control instructions, extended DSP instructions, or two 20-bit DSP instructions. The instruction set architecture of the ASSP has four distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40-bit DSP instruction that extends the capabilities of a 20-bit dyadic DSP instruction by providing powerful bit manipulation.

These instructions are for accelerating calculations within the core processor of the type where D=[(A op1 B) op2 C] and each of "op1" and "op2" can be a multiply, add or extremum (min/max) class of operation on the three operands A, B, and C. The ISA of the ASSP which accelerates these calculations allows efficient chaining of different combinations of operations.

All DSP instructions of the instruction set architecture of the ASSP are dyadic DSP instructions to execute two operations in one instruction with one cycle throughput. A dyadic DSP instruction is a combination of two DSP instructions or operations in one instruction and includes a main DSP operation (MAIN OP) and a sub DSP operation (SUB OP). Generally, the instruction set architecture of the present invention can be generalized to combining any pair of basic DSP operations to provide very powerful dyadic instruction combinations. The DSP arithmetic operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode").

The present invention efficiently executes these dyadic DSP instructions by means of the instruction set architecture and the hardware architecture of the application specific signal processor.

In one embodiment of the present invention, a unified RISC/DSP pipeline controller controls the execution of both reduced instruction set computer (RISC) control instructions and digital signal processing (DSP) instructions within each core processor of the ASSP. The unified RISC/DSP pipeline controller is coupled to the program memory, the RISC control unit, and the four signal processing units (SPs). The program memory stores both DSP instructions and RISC control instructions and the RISC control unit controls the flow of operands and results between the signal processing unit and the data memory. The signal processing units execute the DSP instruction.

The unified RISC/DSP pipeline controller generates DSP control signals to control the execution of the DSP instruction by the signal processing units and RISC control signals to control the execution of the RISC control instruction by the RISC control unit. By utilizing a single unified RISC/DSP pipeline controller to control the execution of both RISC control instructions and DSP instructions, the hardware and power requirements are reduced for the signal processor resulting in increased operational efficiency.

Figure 1A:
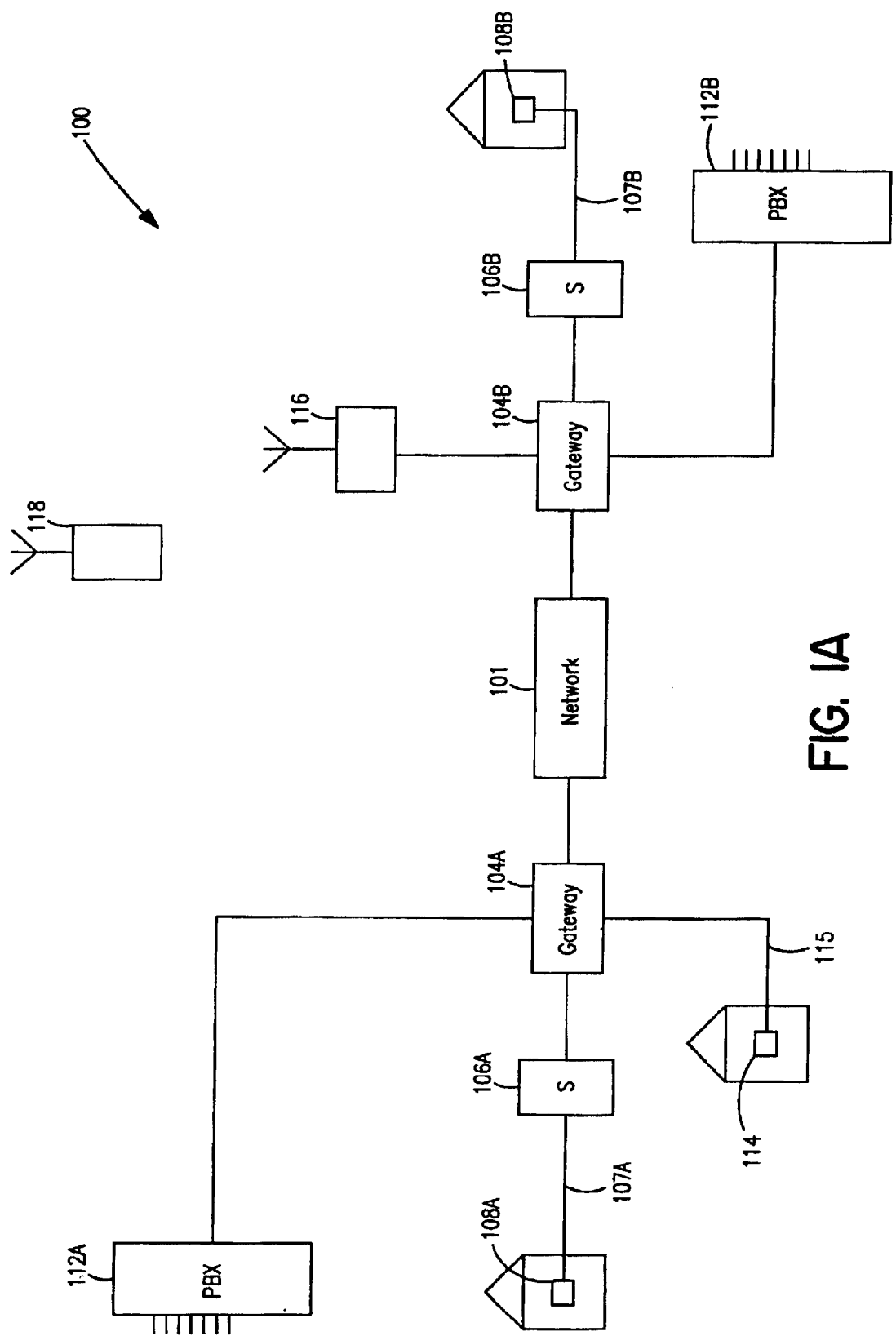
FIG. 1A is a block diagram of a system utilizing the present invention.

Referring now to FIG. 1A, a voice and data communication system 100 is illustrated. The system 100 includes a network 101 that is a packetized or packet-switched network, such as IP, ATM, or frame relay. The network 101 allows the communication of voice/speech and data between endpoints in the system 100, using packets. Data may be of any type including audio, video, email, and other generic forms of data. At each end of the system 100, the voice or data requires packetization when transceived across the network 101.

The system 100 includes gateways 104A, 104B, and 104C in order to packetize the information received for transmission across the network 101. A gateway is a device for connecting multiple networks and devices that use different protocols. Voice and data information may be provided to a gateway 104 from a number of different sources in a variety of digital formats.

In system 100, analog voice signals are transceived by a telephone 108 over the plain old telephone system (POTS) 107A and are coupled into a switch 106A of the public switched telephone network (PSTN). At the switch 106A, the analog signals from the POTS 107A are digitized and transceived to the gateway 104A by time division multiplexing (TDM) with each time slot representing a channel and one DS0 input to gateway 104A.

In system 100, digital voice signals are transceived at public branch exchanges (PBX) 112A and 112B that are coupled to multiple telephones, fax machines, or data modems. Digital voice signals are transceived between PBX 112A and PBX 112B with gateways 104A and 104C, respectively. Digital data signals may also be transceived directly between a digital modem 114 and a gateway 104A. Digital modem 114 may be a Digital Subscriber Line (DSL) modem or a cable modem.

Data signals may also be coupled into system 100 by a wireless communication system by means of a mobile unit 118 transceiving digital signals or analog signals wirelessly to a base station 116. Base station 116 converts analog signals into digital signals or directly passes the digital signals to gateway 104B.

Data may be transceived by means of modem signals over the plain old telephone system (POTS) 107B using a modem 110. Modem signals communicated over POTS 107B are traditionally analog in nature and are coupled into a switch 106B of the public switched telephone network (PSTN). At the switch 106B, analog signals from the POTS 107B are digitized and transceived to the gateway 104B by time division multiplexing (TDM) with each time slot representing a channel and one DS0 input to gateway 104B.

At each of the gateways 104A, 104B and 104C, incoming signals are packetized for transmission across the network 101. Signals received by the gateways 104A, 104B and 104C from the network 101 are depacketized and transcoded for distribution to the appropriate destination.

Figure 1B:
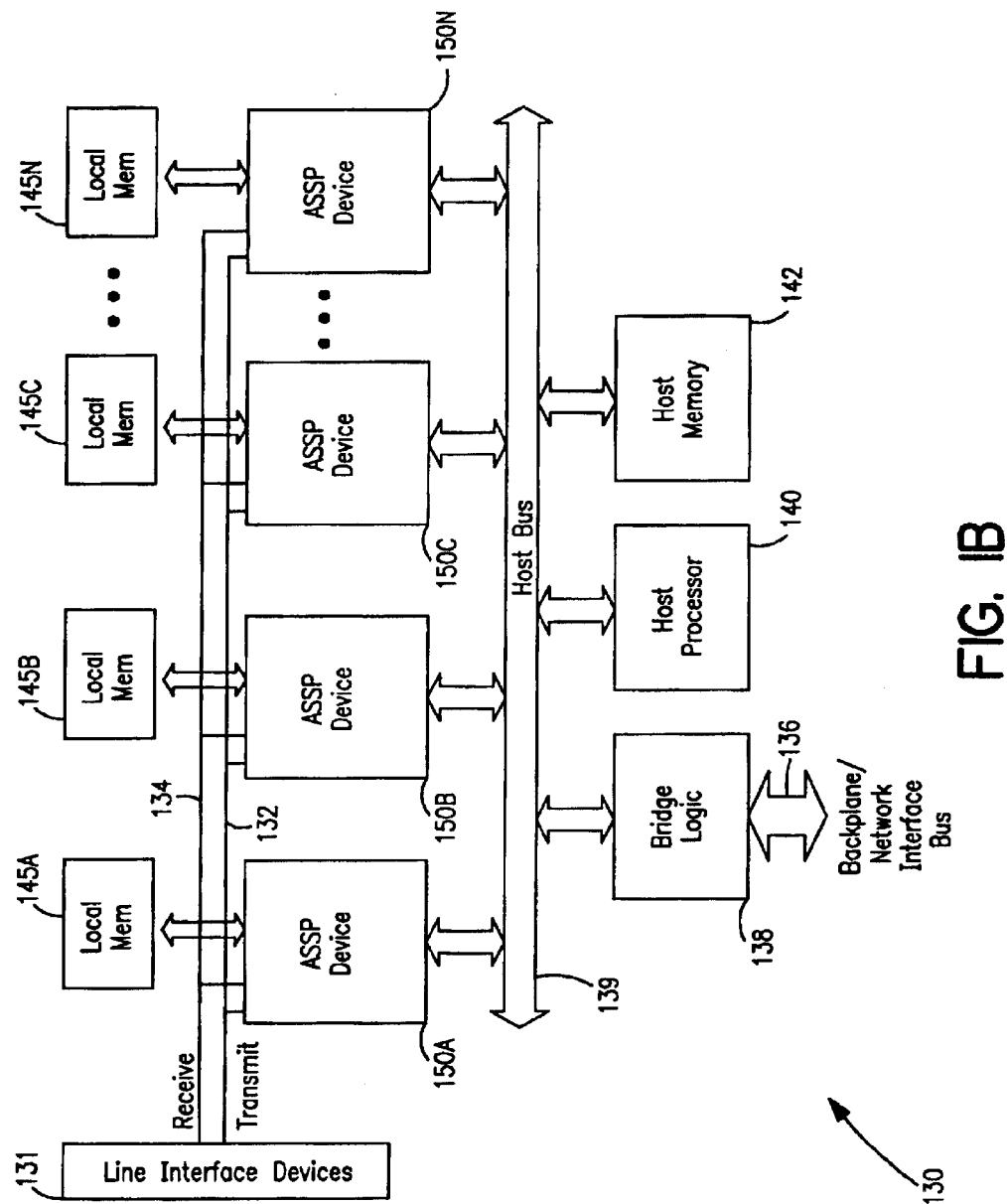
FIG. 1B is a block diagram of a printed circuit board utilizing the present invention within the gateways of the system in FIG. 1A.

Referring now to FIG. 1B, a network interface card (NIC) 130 of a gateway 104 is illustrated. The NIC 130 includes one or more application-specific signal processors (ASSPs) 150A–150N. The number of ASSPs within a gateway is expandable to handle additional channels. Line interface devices 131 of NIC 130 provide interfaces to various devices connected to the gateway, including the network 101. In interfacing to the network 101, the line interface devices packetize data for transmission out on the network 101 and depacketize data which is to be received by the ASSP devices. Line interface devices 131 process information received by the gateway on the receive bus 134 and provides it to the ASSP devices. Information from the ASSP devices 150 is communicated on the transmit bus 132 for transmission out of the gateway. A traditional line interface device is a multi-channel serial interface or a UTOPIA device. The NIC 130 couples to a gateway backplane/network interface bus 136 within the gateway 104. Bridge logic 138 transceives information between bus 136 and NIC 130. Bridge logic 138 transceives signals between the NIC 130 and the backplane/network interface bus 136 onto the host bus 139 for communication to either one or more of the ASSP devices 150A–150N, a host processor 140, or a host memory 142. Optionally coupled to each of the one or more ASSP devices 150A through 150N (generally referred to as ASSP 150) are optional local memory 145A through 145N (generally referred to as optional local memory 145), respectively. Digital data on the receive bus 134 and transmit bus 132 is preferably communicated in bit wide fashion. While internal memory within each ASSP may be sufficiently large to be used as a scratchpad memory, optional local memory 145 may be used by each of the ASSPs 150 if additional memory space is necessary.

Each of the ASSPs 150 provide signal processing capability for the gateway. The type of signal processing provided is flexible because each ASSP may execute differing signal processing programs. Typical signal processing and related voice packetization functions for an ASSP include (a) echo cancellation; (b) video, audio, and voice/speech compression/decompression (voice/speech coding and decoding); (c) delay handling (packets, frames); (d) loss handling; (e) connectivity (LAN and WAN); (f) security (encryption/decryption); (g) telephone connectivity; (h) protocol processing (reservation and transport protocols, RSVP, TCP/IP, RTP, UDP for IP, and AAL2, AAL1, AAL5 for ATM); (i) filtering; (j) Silence suppression; (k) length handling (frames, packets); and other digital signal processing functions associated with the communication of voice and data over a communication system. Each ASSP 150 can perform other functions in order to transmit voice and data to the various endpoints of the system 100 within a packet data stream over a packetized network.

Figure 2:
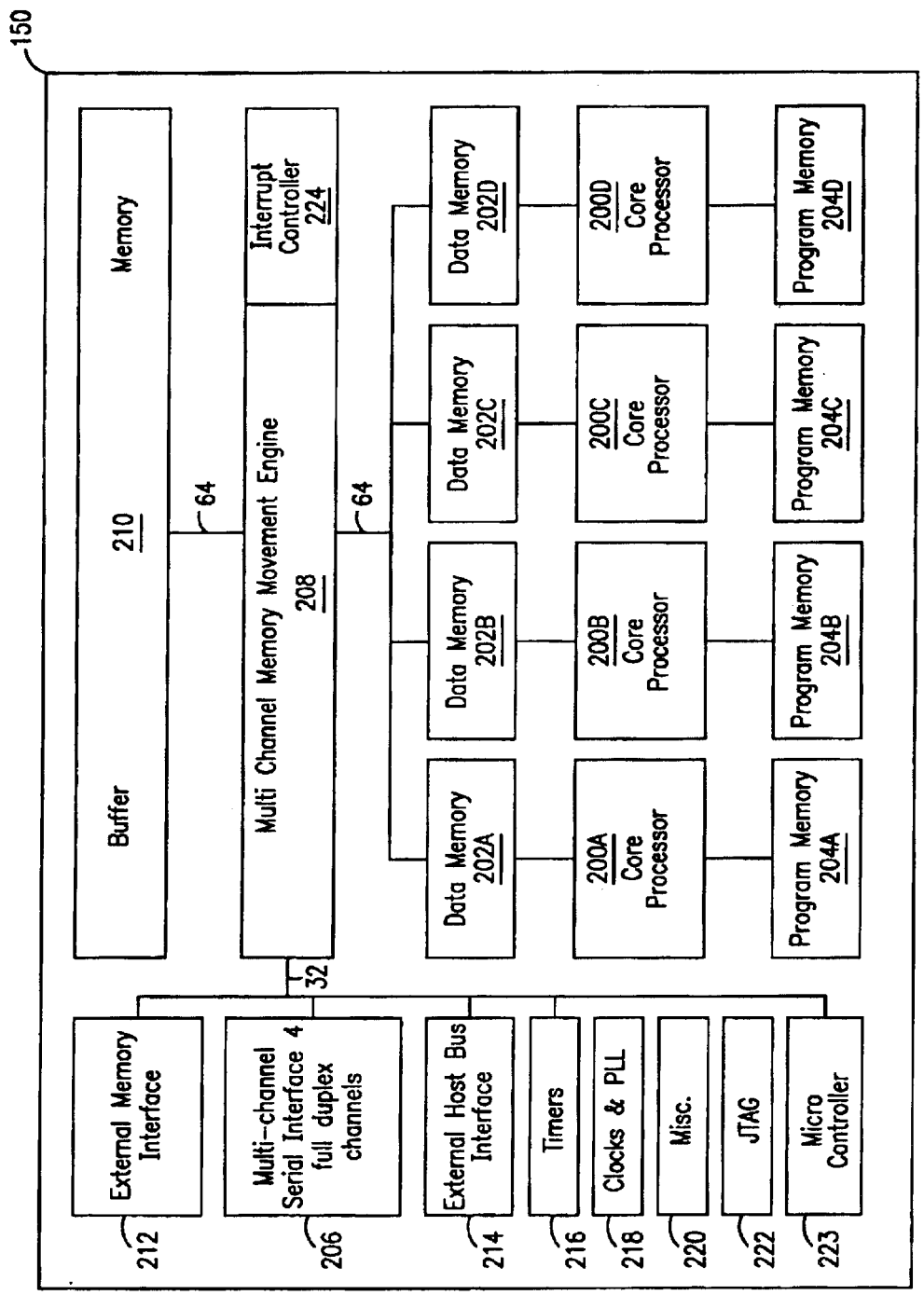
FIG. 2 is a block diagram of an Application Specific Signal Processor (ASSP) according to one embodiment of the present invention.

Referring now to FIG. 2, a block diagram of the ASSP 150 is illustrated. At the heart of the ASSP 150 are four core processors 200A–200D. Each of the core processors 200A–200D is respectively coupled to a data memory 202A–202D and a program memory 204A–204D. Each of the core processors 200A–200D communicates with outside channels through the multi-channel serial interface 206, the multi-channel memory movement engine 208, buffer memory 210, and data memory 202A–202D. The ASSP 150 further includes an external memory interface 212 to couple to the external optional local memory 145. The ASSP 150 includes an external host interface 214 for interfacing to the external host processor 140 of FIG. 1B. Further included within the ASSP 150 are timers 216, clock generators and a phase-lock loop 218, miscellaneous control logic 220, and a Joint Test Action Group (JTAG) test access port 222 for boundary scan testing. The multi-channel serial interface 206 may be replaced with a UTOPIA parallel interface for some applications such as ATM. The ASSP 150 further includes a microcontroller 223 to perform process scheduling for the core processors 200A–200D and the coordination of the data movement within the ASSP as well as an interrupt controller 224 to assist in interrupt handling and the control of the ASSP 150.

Figure 3:
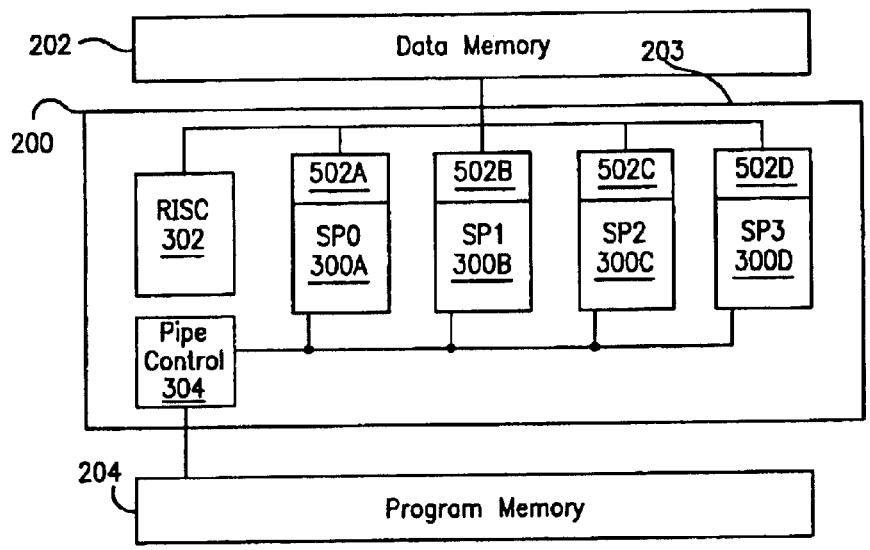
FIG. 3 is a block diagram of an instance of one of the core processors according to one embodiment of the present invention within an ASSP.

Referring now to FIG. 3, a block diagram of the core processor 200 is illustrated coupled to its respective data memory 202 and program memory 204. Core processor 200 is the block diagram for each of the core processors 200A–200D. Data memory 202 and program memory 204 refers to a respective instance of data memory 202A–202D and program memory 204A–204D, respectively. The core processor 200 includes four signal processing units SP0 300A, SP1 300B, SP2 300C and SP3 300D. The core processor 200 further includes a reduced instruction set computer (RISC) control unit 302 and a unified RISC/DSP pipeline controller 304.

According to one embodiment of the present invention, the signal processing units 300A–300D perform the signal processing tasks on data while the RISC control unit 302 and the unified RISC/DSP pipeline controller 304 perform control tasks related to the signal processing functions performed by the SPs 300A–300D. The control provided by the RISC control unit 302 is coupled with the SPs 300A–300D at the pipeline level to yield a tightly integrated core processor 200 that keeps the utilization of the signal processing units 300 at a very high level. Further, the signal processing units 300A–300D are each connected to data memory 202, to each other, and to the RISC 302, via data bus 203, for the exchange of data (e.g. operands).

The signal processing tasks are performed on the datapaths within the signal processing units 300A–300D. The nature of the DSP algorithms are such that they are inherently vector operations on streams of data, that have minimal temporal locality (data reuse). Hence, a data cache with demand paging is not used because it would not function well and would degrade operational performance. Therefore, the signal processing units 300A–300D are allowed to access vector elements (the operands) directly from data memory 202 without the overhead of issuing a number of load and store instructions into memory, resulting in very efficient data processing. Thus, the instruction set architecture of the present invention having a 20 bit instruction word which can be expanded to a 40 bit instruction word, achieves better efficiencies than VLIW architectures using 256-bits or higher instruction widths by adapting the ISA to DSP algorithmic structures. The adapted ISA leads to very compact and low-power hardware that can scale to higher computational requirements. The operands that the ASSP can accommodate are varied in data type and data size. The data type may be real or complex, an integer value or a fractional value, with vectors having multiple elements of different sizes. The data size in the preferred embodiment is 64 bits but larger data sizes can be accommodated with proper instruction coding.

Figure 4:
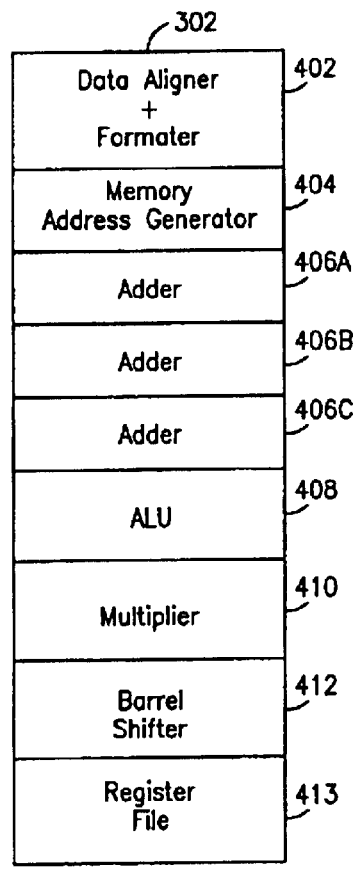
FIG. 4 is a block diagram of the RISC processing unit within the core processors of FIG. 3.

Referring now to FIG. 4, a detailed block diagram of the RISC control unit 302 is illustrated. RISC control unit 302 includes a data aligner and formatter 402, a memory address generator 404, three adders 406A–406C, an arithmetic logic unit (ALU) 408, a multiplier 410, a barrel shifter 412, and a register file 413. The register file 413 points to a starting memory location from which memory address generator 404 can generate addresses into data memory 202. The RISC control unit 302 is responsible for supplying addresses to data memory so that the proper data stream is fed to the signal processing units 300A–300D. The RISC control unit 302 is a register to register organization with load and store instructions to move data to and from data memory 202. Data memory addressing is performed by RISC control unit using a 32-bit register as a pointer that specifies the address, post-modification offset, and type and permute fields. The type field allows a variety of natural DSP data to be supported as a "first class citizen" in the architecture. For instance, the complex type allows direct operations on complex data stored in memory removing a number of bookkeeping instructions. This is useful in supporting QAM demodulators in data modems very efficiently.

Figure 5A:
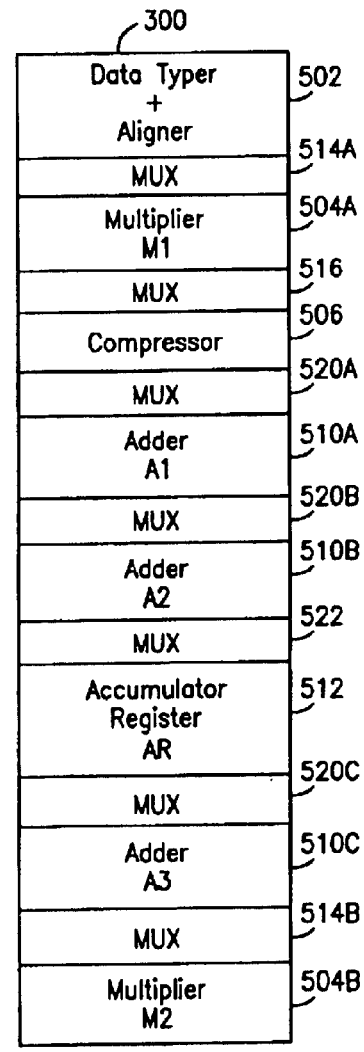
FIG. 5A is a block diagram of an instance of a signal processing unit (SP) according to one embodiment of the present invention within a core processor of FIG. 3.

Referring now to FIG. 5A, a block diagram of a signal processing unit 300 is illustrated which represents an instance of the SPs 300A–300D. Each of the signal processing units 300 includes a data typer and aligner 502, a first multiplier M1 504A, a compressor 506, a first adder A1 510A, a second adder A2 510B, an accumulator register 512, a third adder A3 510C, and a second multiplier M2 504B. Adders 510A–510C are similar in structure and are generally referred to as adder 510. Multipliers 504A and 504B are similar in structure and generally referred to as multiplier 504. Each of the multipliers 504A and 504B have a multiplexer 514A and 514B respectively at its input stage to multiplex different inputs from different busses into the multipliers. Each of the adders 510A, 510B, 510C also have a multiplexer 520A, 520B, and 520C respectively at its input stage to multiplex different inputs from different busses into the adders. These multiplexers and other control logic allow the adders, multipliers and other components within the signal processing units 300A–300C to be flexibly interconnected by proper selection of multiplexers.

In the preferred embodiment, multiplier M1 504A, compressor 506, adder A1 510A, adder A2 510B and accumulator 512 can receive inputs directly from external data buses through the data typer and aligner 502. In the preferred embodiment, adder 510C and multiplier M2 504B receive inputs from the accumulator 512 or the outputs from the execution units multiplier M1 504A, compressor 506, adder A1 510A, and adder A2 510B.

Program memory 204 couples to the pipe control 304 that includes an instruction buffer that acts as a local loop cache. The instruction buffer in the preferred embodiment has the capability of holding four instructions. The instruction buffer of the unified RISC/DSP pipe controller 304 reduces the power consumed in accessing the main memories to fetch instructions during the execution of program loops.

Figure 5B:
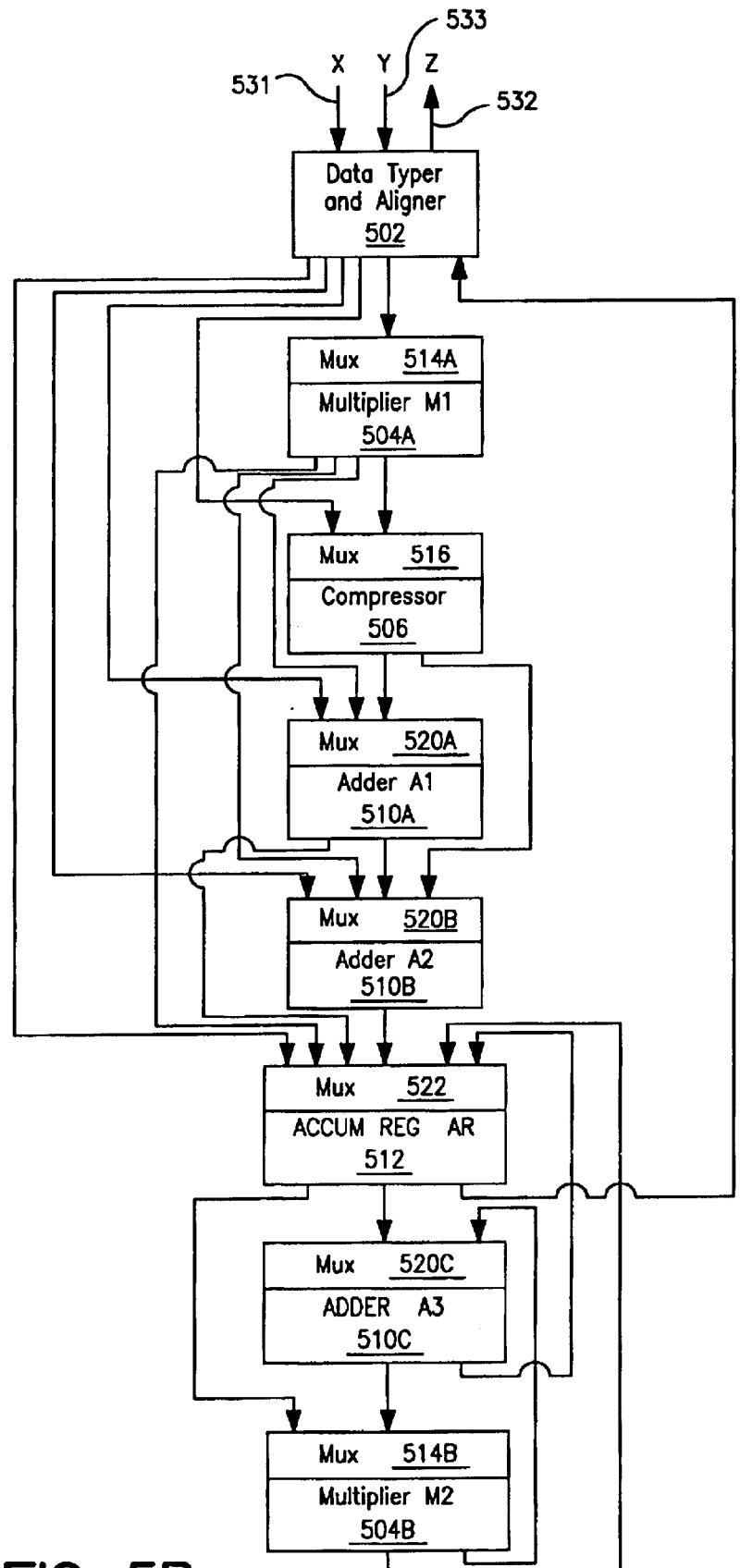
FIG. 5B is a more detailed block diagram of FIG. 5A illustrating the bus structure of the signal processing unit according to one embodiment of the present invention.

Referring now to FIG. 5B, a more detailed block diagram of the functional blocks and the bus structure of the signal processing unit 300 is illustrated. Dyadic DSP instructions are possible because of the structure and functionality provided in each signal processing unit.

Output signals are coupled out of the signal processor 300 on the Z output bus 532 through the data typer and aligner 502. Input signals are coupled into the signal processor 300 on the X input bus 531 and Y input bus 533 through the data typer and aligner 502. Internally, the data typer and aligner 502 has a different data bus to couple to each of multiplier M1 504A, compressor 506, adder A1 510A, adder A2 510B, and accumulator register AR 512. Also, output data is coupled from the accumulator register AR 512 into the data typer and aligner 502.

Multiplier M1 504A has buses to couple its output into the inputs of the compressor 506, adder A1 510A, adder A2 510B, and the accumulator registers AR 512. Compressor 506 has buses to couple its output into the inputs of adder A1 510A and adder A2 510B. Adder A1 510A has a bus to couple its output into the accumulator registers 512. Adder A2 510B has buses to couple its output into the accumulator registers 512.

Accumulator registers 512 has buses to couple its output into multiplier M2 504B, adder A3 510C, and data typer and aligner 502. Adder A3 510C has buses to couple its output into the multiplier M2 504B and the accumulator registers 512. Multiplier M2 504B has buses to couple its output into the inputs of the adder A3 510C and the accumulator registers AR 512.

INSTRUCTION SET ARCHITECTURE

The instruction set architecture of the ASSP 150 is tailored to digital signal processing applications including audio and speech processing such as compression/decompression and echo cancellation. In essence, the instruction set architecture implemented with the ASSP 150, is adapted to DSP algorithmic structures. The adaptation of the ISA of the present invention to DSP algorithmic structures is a balance between ease of implementation, processing efficiency, and programmability of DSP algorithms. The ISA of the present invention provides for data movement operations, DSP/arithmetic/logical operations, program control operations (such as function calls/returns, unconditional/conditional jumps and branches), and system operations (such as privilege, interrupt/trap/hazard handling and memory management control).

Referring now to FIG. 6A, an exemplary instruction sequence 600 is illustrated for a DSP algorithm program model employing the instruction set architecture of the present invention. The instruction sequence 600 has an outer loop 601 and an inner loop 602. Because DSP algorithms tend to perform repetitive computations, instructions 605 within the inner loop 602 are executed more often than others. Instructions 603 are typically parameter setup code to set the memory pointers, provide for the setup of the outer loop 601, and other 2×20 control instructions. Instructions 607 are typically context save and function return instructions or other 2×20 control instructions. Instructions 603 and 607 are often considered overhead instructions that are typically infrequently executed. Instructions 604 are typically to provide the setup for the inner loop 602, other control through 2×20 control instructions, dual loop setup, and offset extensions for pointer backup. Instructions 606 typically provide tear down of the inner loop 602, other control through 2×20 control instructions, and combining of datapath results within the signal processing units. Instructions 605 within the inner loop 602 typically provide inner loop execution of DSP operations, control of the four signal processing units 300 in a single instruction multiple data execution mode, memory access for operands, dyadic DSP operations, and other DSP functionality through the 20/40 bit DSP instructions of the ISA of the present invention.

Because instructions 605 are so often repeated, significant improvement in operational efficiency may be had by providing the DSP instructions, including general dyadic instructions and dyadic DSP instructions, within the ISA of the present invention.

The instruction set architecture of the ASSP 150 can be viewed as being two component parts, one (RISC ISA) corresponding to the RISC control unit and another (DSP ISA) to the DSP datapaths of the signal processing units 300. The RISC ISA is a register based architecture including sixteen registers within the register file 413, while the DSP ISA is a memory based architecture with efficient digital signal processing instructions. The instruction word for the ASSP is typically 20 bits but can be expanded to 40-bits to control two RISC control instructions or DSP instructions to be executed in series or parallel, such as a RISC control instruction executed in parallel with a DSP instruction, or a 40 bit extended RISC control instruction or DSP instruction.

The instruction set architecture of the ASSP has four distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40-bit DSP instruction that extends the capabilities of a 20-bit dyadic DSP instruction by providing powerful bit manipulation.

These instructions are for accelerating calculations within the core processor 200 of the type where $D=[(A \text{ op1 } B) \text{ op2 } C]$ and each of "op1" and "op2" can be a multiply, add or extremum (min/max) class of operation on the three operands A, B, and C. The ISA of the ASSP 150 that accelerates these calculations allows efficient chaining of different combinations of operations. Because these type of operations require three operands, they must be available to the processor. However, because the device size places limits on the bus structure, bandwidth is limited to two vector reads and one vector write each cycle into and out of data memory 202. Thus one of the operands, such as B or C, needs to come from another source within the core processor 200. The third operand can be placed into one of the registers of the accumulator 512 or the RISC register file 413. In order to accomplish this within the core processor 200 there are two subclasses of the 20-bit DSP instructions which are (1) A and B specified by a 4-bit specifier, and C and D by a 1-bit specifier and (2) A and C specified by a 4-bit specifier, and B and D by a 1 bit specifier.

Instructions for the ASSP are always fetched 40-bits at a time from program memory with bits 39 and 19 indicating the type of instruction. After fetching, the instruction is grouped into two sections of 20 bits each for execution of operations.

Referring to FIG. 6B, in the case of 20-bit RISC control instructions with parallel execution (bit 39=0, bit 19=0), the two 20-bit sections are RISC control instructions that are executed simultaneously. In the case of 20-bit RISC control instructions for serial execution (bit 39=0, bit 19=1), the two 20-bit sections are RISC control instructions that are executed serially. In the case of 20-bit DSP instructions for serial execution (bit 39=1, bit 19=1), the two 20-bit sections are DSP instructions that are executed serially.

In the case of 40-bit extended DSP instructions (bit 39=1, bit 19=0), the two 20 bit sections form one extended DSP instruction and are executed simultaneously. This 40-bit extended DSP instruction extends the capabilities of a 20-bit dyadic DSP instruction- the first 20 bit section is a DSP instruction and the second 20-bit section extends the capabilites of the first DSP instruction and provides powerful bit manipulation instructions, i.e., it is a 40-bit DSP instruction that operates on the top row of functional unit with extended capabilities.

In the 40 bit instruction word, the type of extension from the 20 bit instruction word falls into five categories:
1) Control and Specifier extensions that override the control bits in mode registers
2) Type extensions that override the type specifier in address registers
3) Permute extensions that override the permute specifier for vector data in address registers
4) Offset extensions that can replace or extend the offsets specified in the address registers The 40-bit DSP instructions with the 20 bit extensions allow a large immediate value (16 to 20 bits) to be specified in the instruction and powerful bit manipulation instructions.

The ISA of the ASSP 150 is fully predicated providing for execution prediction. Within the 20-bit RISC control instruction word and the 40-bit extended DSP instruction word there are 2 bits of each instruction specifying one of four predicate registers within the RISC control unit 302. Depending upon the condition of the predicate register, instruction execution can conditionally change base on its contents.

In order to access operands within the data memory 202, the register file 413 of the RISC 302, or the registers within the accumulator 512, a 6-bit specifier is used in the DSP 40-bit extended instructions to access operands in memory and registers.

FIG. 6C shows an exemplary 6-bit operand specifier according to one embodiment of the present invention. Of the six bit specifier used in the extended DSP instructions, the MSB (Bit 5) indicates whether the access is a memory access or register access. In this embodiment, if Bit 5 is set to logical one, it denotes a memory access for an operand. If Bit 5 is set to a logical zero, it denotes a register access for an operand.

If Bit 5 is set to 1, the contents of a specified register (rX where X: 0–7) are used to obtain the effective memory address and post-modify the pointer field by one of two possible offsets specified in one of the specified rX registers. FIG. 6D shows an exemplary memory address register according to one embodiment of the present invention.

If Bit 5 is set to 0, Bit 4 determines what register set has the contents of the desired operand. If Bit-4 is set to 1, the remaining specified bits control access to the general purpose file (r0–r15) within the register file 413. If Bit-4 is set to 0, then the remaining specified bits 3:0 control access to the general purpose register file (r0–r15) within the register file 413, the accumulator registers 512 of the signal processing units 300, or to execution unit registers. The general purpose file (GPR) holds data or memory addresses to allow RISC or DSP operand access. RISC instructions in general access only the GPR file. DSP instructions access memory using GPR as addresses.

The 20-bit DSP instruction words have 4-bit operand specifiers that can directly access data memory using 8 address registers (r0–r7) within the register file 413 of the RISC control unit 302. The method of addressing by the 20 bit DSP instruction word is regular indirect with the address register specifying the pointer into memory, post-modification value, type of data accessed and permutation of the data needed to execute the algorithm efficiently.

FIG. 6E illustrates an exemplary 5-bit operand specifier according to one embodiment of the invention that includes the 4-bit specifier for general data operands and special purpose registers (SPR). The 5-bit operand specifier is used in RISC control instructions.

It should be noted that the preceding bit maps for operand specifiers to access registers and memory illustrated in FIGS. 6B–6E are only exemplary, and as should be appreciated by one skilled in the art, any number of bit map schemes, register schemes, etc., could be used to implement the present invention.

DSP INSTRUCTIONS

There are four major classes of DSP instructions for the ASSP 150 these are:
1) Multiply (MULT): Controls the execution of the main multiplier connected to data buses from memory. Controls: Rounding, sign of multiply Operates on vector data specified through type field in address register
Second operation: Add, Sub, Min, Max in vector or scalar mode
2) Add (ADD): Controls the execution of the main-adder Controls: absolute value control of the inputs, limiting the result
Second operation: Add, add-sub, mult, mac, min, max
3) Extremum (MIN/MAX): Controls the execution of the main-adder Controls: absolute value control of the inputs, Global or running max/min with T register, TR register recording control Second operation: add, sub, mult, mac, min, max
4) Misc: type-match and permute operations.

All of the DSP instructions control the multipliers 504A–504B, adders 510A–510C, compressor 506 and the accumulator 512, the functional units of each signal processing unit 300A–300D. The ASSP 150 can execute these DSP arithmetic operations in vector or scalar fashion. In scalar execution, a reduction or combining operation is performed on the vector results to yield a scalar result. It is common in DSP applications to perform scalar operations, which are efficiently performed by the ASSP 150.

Efficient DSP execution is improved by the hardware architecture of the present invention. In this case, efficiency is improved in the manner that data is supplied to and from data memory 202, to and from the RISC 302, and to and from the four signal processing units (SPs) 300 themselves (e.g. the SPs can store data themselves within accumulator registers), to feed the four SPs 300 and the DSP functional units therein, via the data bus 203. The data bus 203 is comprised of two buses, X bus 531 and Y bus 533, for X and Y source operands, and one Z bus 532 for a result write. All buses, including X bus 531, Y bus 533, and Z bus 532, are preferably 64 bits wide. The buses are uni-directional to simplify the physical design and reduce transit times of data. In the preferred embodiment, when in a 20 bit DSP mode, if the X and Y buses are both carrying operands read from memory for parallel execution in a signal processing unit 300, the parallel load field can only access registers within the register file 413 of the RISC control unit 302. Additionally, the four signal processing units 300A–300D in parallel provide four parallel MAC units (multiplier 504A, adder 510A, and accumulator 512) that can make simultaneous computations. This reduces the cycle count from 4 cycles ordinarily required to perform four MACs to only one cycle.

DYADIC DSP INSTRUCTIONS

All DSP instructions of the instruction set architecture of the ASSP 150 are dyadic DSP instructions within the 20-bit or 40-bit instruction word. A dyadic DSP instruction informs the ASSP in one instruction and one cycle to perform two operations.

FIG. 6F is a chart illustrating the permutations of the dyadic DSP instructions. The dyadic DSP instruction 610 includes a main DSP operation 611 (MAIN OP) and a sub DSP operation 612 (SUB OP), a combination of two DSP instructions or operations in one dyadic instruction. Generally, the instruction set architecture of the present invention can be generalized to combining any pair of basic DSP operations to provide very powerful dyadic instruction combinations. Compound DSP operational instructions can provide uniform acceleration for a wide variety of DSP algorithms not just multiply-accumulate intensive filters.

The DSP instructions or operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode"). Any two DSP instructions can be combined together to form a dyadic DSP instruction. The NOP instruction is used for the MAIN OP or SUB OP when a single DSP operation is desired to be executed by the dyadic DSP instruction. There are variations of the general DSP instructions such as vector and scalar operations of multiplication or addition, positive or negative multiplication, and positive or negative addition (i.e. subtraction).

Referring now to FIGS. 6G and 6H, bitmap syntax for exemplary 20-bit non-extended and 40-bit extended DSP instructions is illustrated. As previously discussed, for the 20-bit non-extended instruction word the bitmap syntax is the twenty most significant bits of a forty bit word while for 40-bit extended DSP instruction the bitmap syntax is an instruction word of forty bits. Particularly, FIG. 6G and 6H taken together illustrate an exemplary 40-bit extended DSP instruction. FIG. 6G illustrates bitmap syntax for a 20-bit DSP instruction. FIG. 6H illustrates the bitmap syntax for the second 20-bit section of a 40-bit extended DSP instruction.

As shown in FIG. 6G, the three most significant bits (MSBs), bits numbered 37 through 39, of the first 20-bit section of the dyadic DSP instruction indicates the MAIN OP instruction type while the SUB OP is located near the end of the first 20-bit section at bits numbered 20 through 22. In the preferred embodiment, the MAIN OP instruction codes are 000 for NOP, 101 for ADD, 110 for MIN/MAX, and 100 for MULT. The SUB OP code for the given DSP instruction varies according to what MAIN OP code is selected. In the case of MULT as the MAIN OP, the SUB OPs are 000 for NOP, 001 or 010 for ADD, 100 or 011 for a negative ADD or subtraction, 101 or 110 for MIN, and 111 for MAX. The bitmap syntax for other MAIN OPs and SUB OPs can be seen in FIG. 6G.

As shown in FIG. 6H, under "Control and specifier Extensions", the lower twenty bits of the control extended dyadic DSP instruction, i.e. the extended bits, control the signal processing unit to perform rounding, limiting, absolute value of inputs for SUB OP, or a global MIN/MAX operation with a register value.

The bitmap syntax of the dyadic DSP instructions can be converted into text syntax for program coding. Using the multiplication or MULT as an example, its text syntax for multiplication or MULT is (vmul|vmuln).(vadd|vsub|vmax|sadd|ssub|smax) da, sx, sa, sy [,(ps0)|ps1)]

The "vmul|vmuln" field refers to either positive vector multiplication or negative vector multiplication being selected as the MAIN OP. The next field, "vadd|vsub|vmax|sadd|ssub|smax", refers to either vector add, vector subtract, vector maximum, scalar add, scalar subtraction, or scalar maximum being selected as the SUB OP. The next field, "da", refers to selecting one of the registers within the accumulator for storage of results. The field "sx" refers to selecting a register within the RISC register file 413 which points to a memory location in memory as one of the sources of operands. The field "sa" refers to selecting the contents of a register within the accumulator as one of the sources of operands. The field "sy" refers to selecting a register within the RISC register file 413 which points to a memory location in memory as another one of the sources of operands. The field of "[,(ps0) |ps1)]" refers to pair selection of keyword PS0 or PS1 specifying which are the source-destination pairs of a parallel-store control register.

FIG. 6I illustrates control instructions for the ISA according to one embodiment of the present invention. FIG. 6J illustrates a set of extended control instructions for the ISA according to one embodiment of the present invention. FIG. 6K illustrates a set of 40-bit DSP instructions for the ISA according to one embodiment of the present invention.

UNIFIED RISC/DSP PIPELINE CONTROLLER

FIG. 7 is a functional block diagram illustrating an exemplary architecture for a unified RISC/DSP pipeline controller 304 according to one embodiment of the present invention. In this embodiment, the unified RISC/DSP pipeline controller 304 controls the execution of both reduced instruction set computer (RISC) control instructions and digital signal processing (DSP) instructions within each core processor of the ASSP.

As shown in FIG. 7, the unified RISC/DSP pipeline controller 304 is coupled to the program memory 204, the RISC control unit 302, and the four signal processing units (SPs) 300. The unified pipeline controller 304 is coupled to the program memory 204 by the address bus 702 and the instruction bus 704. The program memory 204 stores both DSP instructions and RISC control instructions. The RISC 302 transmits a request along the instruction request bus 706 to the F0 Fetch control stage 708 of the unified pipeline controller 304 to fetch a new instruction. F0 Fetch control stage 708 generates an address and transmits the address onto the address bus 702 to address a memory location of a new instruction in the program memory 204. The instruction is then signaled onto to the instruction bus 704 to the F0 Fetch control stage 708 of the unified pipeline controller 304.

The unified RISC/DSP pipeline controller 304 is coupled to the RISC control unit 302 via RISC control signal bus 710. The unified pipeline controller 304 generates RISC control signals and transmits them onto the RISC control signal bus 710 to control the execution of the RISC control instruction by the RISC control unit 302. Also, as previously described, the RISC control unit 302 controls the flow of operands and results between the signal processing units 300 and data memory 202 via data bus 203.

The unified RISC/DSP pipeline controller 304 is coupled to the four signal processing units (SPs) 300A–300D via DSP control signal bus 712. The unified pipeline controller 304 generates DSP control signals and transmits them onto the DSP control signal bus 712 to control the execution of the DSP instruction by the SPs 300A–300D. The signal processing units execute the DSP instruction using multiple data inputs from the data memory 202, the RISC 302, and accumulator registers within the SPs, delivered to the SPs along data bus 203. By utilizing the single unified RISC/DSP pipeline controller 304 of the present invention to control the execution of both RISC control instructions and DSP instructions, the hardware and power requirements are reduced for the signal processor resulting in increased operational efficiency.

Referring to FIGS. 8a and 8b, in conjunction with FIG. 7, the inner stages of the unified RISC/DSP pipeline controller will now be discussed. FIG. 8a is a diagram illustrating the operations occurring in different stages of the unified RISC/DSP pipeline controller according to one embodiment of the present invention. FIG. 8b is a diagram illustrating the timing of certain operations for the unified RISC/DSP pipeline controller of FIG. 8a according to one embodiment of the present invention.

As illustrated in FIG. 8a, the unified RISC/DSP pipeline controller 304 is capable of executing both RISC control instructions and DSP instructions. The RISC control instruction is executed within a shared portion 802 of the unified pipeline controller 304 and the digital signal processing instruction is executed within the shared portion 802 of the unified pipeline and within a DSP portion 804 of the unified pipeline.

The unified pipeline controller 304 has a two-stage instruction fetch section including a F0 Fetch control stage 708 and a F1 Fetch control stage 808. As previously discussed, the RISC 302 transmits a request along the instruction request bus 706 to the F0 Fetch control stage 708 to fetch a new instruction. The F0 Fetch control stage 708 generates an address and transmits the address onto the address bus 702 to address a memory location of a new instruction in the program memory 204. The DSP or RISC control instruction is then signaled onto the instruction bus 704 to the F0 Fetch control stage 708 and is stored within pipeline register 711. As should be appreciated, all of the pipeline registers are clocked to sequentially move the instruction down the pipeline. Upon the next clock cycle of the pipeline, the fetched instruction undergoes further processing by the F1 Fetch control stage 808 and is stored within instruction pipeline register 713. By the end of the F1 Fetch control stage 808 a 40-bit DSP or RISC control instruction has been read and latched into the instruction pipeline register 713. Alternatively, the instruction can be stored within instruction register 715 for loop buffering of the instruction as will be discussed later. Also, a program counter (PC) is driven to memory.

The unified RISC/DSP pipeline controller 304 has a two stage Decoder section including a D0 decode stage 812 and a D1 decode stage 814 to decode DSP and RISC control instructions. For a DSP instruction, upon the next clock cycle, the DSP instruction is transmitted from the instruction pipeline register 713 to the D0 decode stage 812 where the DSP instruction is decoded and DSP control signals are generated and transmitted via DSP control signal bus 712 to the SPs 300 to control the execution of the DSP instruction by the SPs. The decoded DSP instruction is then stored in pipeline register 717.

Upon the next clock cycle, the DSP instruction is transmitted from the pipeline register 717 to the D1 decode stage 814 where the DSP instruction is further decoded and DSP control signals are generated and transmitted via DSP control signal bus 712 to the SPs 300 to control the execution of the DSP instruction by the SPs. The decoded DSP instruction is then stored in pipeline register 719. The D1 decode stage 814 also generates memory addresses for use by the SPs and can generate DSP control signals identifying which SPs should be used for DSP tasks. Also, a new program counter (PC) is driven to program memory 204.

For a RISC control instruction, upon the next clock cycle, the RISC control instruction is transmitted from the instruction pipeline register 713 to the D0 decode stage 812 where the RISC control instruction is decoded and RISC control signals are generated and transmitted via RISC control signal bus 710 to the RISC 302 to control the execution of the RISC control instruction by the RISC 302. The decoded RISC control instruction is then stored in pipeline register 717. The D0 decode stage 812 also decodes register specifiers for general purpose register (GPR) access and reads the GPRs of the register file 413 of the RISC 302.

Upon the next clock cycle, the RISC control instruction is transmitted from the pipeline register 717 to the D1 decode stage 814 where the RISC control instruction is further decoded and RISC control signals are generated and transmitted via RISC control signal bus 710 to the RISC 302 to control the execution of the RISC control instruction by the RISC 302 and, particularly, to perform the RISC control operation. The decoded RISC control instruction is then stored in pipeline register 719. Also, a new program counter (PC) is driven to program memory 204.

The unified RISC/DSP pipeline controller 304 has a two-stage memory access section including a M0 memory access stage 818 and a M1 memory access stage 820 to provide memory access for DSP and RISC control instructions. For a DSP instruction, upon the next clock cycle, the decoded DSP instruction is transmitted from the pipeline register 719 to the M0 memory stage 818 where the DSP instruction undergoes processing and DSP control signals are generated and transmitted via DSP control signal bus 712 to the SPs 300 to control the execution of the DSP instruction by the SPs. Particularly, the DSP control signals provide memory access for the SPs by driving data addresses to data memory 202 for requesting data (e.g. operands) from data memory 202 for use by the SPs. The processed DSP instruction is then stored in pipeline register 721.

Upon the next clock cycle, the processed DSP instruction is transmitted from the pipeline register 721 to the M1 memory stage 820 where the DSP instruction undergoes processing and DSP control signals are generated and transmitted via DSP control signal bus 712 to the SPs 300 to control the execution of the DSP instruction by the SPs. Particularly, the DSP control signals provide memory access for the SPs by driving previously addressed data (e.g. operands) back from data memory 202 to the SPs for use by the SPs for executing the DSP instruction. The processed DSP instruction is then stored in pipeline register 723.

For a RISC control instruction, upon the next clock cycle, the decoded RISC control instruction is transmitted from the pipeline register 719 to the M0 memory stage 818 where the RISC control instruction undergoes processing and RISC control signals are generated and transmitted via RISC control signal bus 710 to the RISC 302 to control the execution of the RISC control instruction by the RISC 302. Particularly, General Purpose Register (GPR) writes are performed to the register file 413 of the RISC 302 to update the registers after the prior performance of the RISC control operation. The processed RISC control instruction is then stored in pipeline register 721.

Upon the next clock cycle, the processed RISC control instruction is transmitted from the pipeline register 721 to the M1 memory stage 820 where the RISC control instruction undergoes processing and RISC control signals are generated and transmitted via RISC control signal bus 710 to the RISC 302 to control the execution of the RISC control instruction by the RISC 302. Particularly, memory (e.g. data memory 203) or registers (e.g. GPR) are updated, for example, by Load or Store instructions. This completes the control of the execution of the RISC control instruction by the unified RISC/DSP pipeline controller 304.

The unified RISC/DSP pipeline controller 304 has a three-stage execution section including an E0 execution stage 822, an E1 execution stage 824, and an E2 execution stage 824 to provide DSP control signals SPs 300 to control the execution of the DSP instruction by the SPs. The three execution stages generally provide DSP control signals to the SPs 300 to control the functional units of each SP (e.g. multipliers, adders, and accumulators, etc.), previously discussed, to perform the DSP operations, such as multiply and add, etc., of the DSP instruction.

Starting with the E0 execution stage 822, upon the next clock cycle, the processed DSP instruction is transmitted from the pipeline register 723 to the E0 execution stage 822 where the DSP instruction undergoes execution processing and DSP control signals are generated and transmitted via DSP control signal bus 712 to the SPs 300 to control the execution of the DSP instruction by the SPs. Particularly, the DSP control signals control the execution of multiply, add, and min-max operations by the SPs. Also, the DSP control signals control the SPs to update the register file 413 of the RISC 302 with Load data from data memory 202. The execution processed DSP instruction is then stored in pipeline register 725.

Upon the next clock cycle, the execution processed DSP instruction is transmitted from the pipeline register 725 to the E1 execution stage 824 where the DSP instruction undergoes execution processing and DSP control signals are generated and transmitted via DSP control signal bus 712 to the SPs 300 to control the execution of the DSP instruction by the SPs. Particularly, the DSP control signals control the execution of multiply, add, (and min-max) operations of the DSP instruction by the SPs. Further, the DSP control signals control the execution of accumulation of vector multiplies and the updating of flag registers by the SPs. The execution processed DSP instruction is then stored in pipeline register 727.

Upon the next clock cycle, the execution processed DSP instruction is transmitted from the pipeline register 727 to the E2 execution stage 826 where the DSP instruction undergoes execution processing and DSP control signals are generated and transmitted via DSP control signal bus 712 to the SPs 300 to control the execution of the DSP instruction by the SPs. Particularly, the DSP control signals control the execution of multiply, min-max operations, and the updating of flag registers by the SPs. The execution processed DSP instruction is then stored in pipeline register 729.

The unified RISC/DSP pipeline controller 304 has a last single WB Writeback stage 828 to write back data to data memory 202 after execution of the DSP instruction. Upon the next clock cycle, the execution processed DSP instruction is transmitted from the pipeline register 729 to the WB Writeback stage 828 where the DSP instruction undergoes processing and DSP control signals are generated and transmitted via DSP control signal bus 712 to the SPs 300 to control the execution of the DSP instruction by the SPs. Particularly, the DSP control signals control the SPs in writing back data to data memory 202 after execution of the DSP instruction. More particularly, in the WB Writeback stage 828, DSP control signals are generated to control the SPs in driving data into data memory from a parallel store operation and in writing data into the data memory. Further, DSP control signals are generated to instruct the SPs to perform a last add stage for saturating adds and to update accumulators from the saturating add operation. This completes the control of the execution of the DSP instruction by the unified RISC/DSP pipeline controller 304.

By utilizing the single unified RISC/DSP pipeline controller 304 of the present invention to control the execution of both RISC control instructions and DSP instructions, the hardware and power requirements are reduced for the application specific signal processor (ASSP) resulting in increased operational efficiency. For example, when RISC control instructions are being performed the DSP portion 804 of the unified pipeline controller 304 and the SPs 300 are not utilized resulting in power savings. On the other hand, when DSP instructions are being performed, especially when many DSP instructions are looped, the RISC 302 is not utilized, resulting in power savings.

The unified RISC/DSP pipeine controller 304 melds together traditionally separate RISC and DSP pipelines in a seamless integrated way to provide fine-grained control and parallelism. Also, the pipeline is deep enough to allow clock scaling for future products. The unified RISC/DSP pipeline controller 304 dramatically increases the efficiency of the execution of both DSP instruction and RISC control instructions by a signal processor.

LOOP BUFFERING

Referring again to FIG. 7, loop buffering for the signal processing units 300 will now be discussed. As previously discussed, the unified RISC/DSP pipeline controller 304 couples to the RISC control unit 302 and the program memory 204 to provide the control of the signal processing units 300 in a core processor 200. The unified pipeline controller 304, includes an F0 fetch control stage 708, an F1 fetch control stage 808 and a D0 decoding stage 812 coupled as shown in FIG. 7. The F0 fetch control stage 708 in conjunction with the RISC control unit 302 generate addresses to fetch new instructions from the program memory 204. F1 fetch control stage 808 receives the newly fetched instructions.

F1 fetch control stage 808 includes a loop buffer 750 to store and hold instructions for execution within a loop and an instruction register 715 coupled to the output of the loop buffer 750 to store the next instruction for decoding by the D0 decoding stage 812. The output from the loop buffer 750 can be stored into the instruction register 715 to generate an output that is coupled into the D0 decoding stage 812. The registers in the loop buffer 750 are additionally used for temporary storage of new instructions when an instruction stall in a later pipeline stage (not shown) causes the entire execution pipeline to stall for one or more clock cycles. Referring momentarily back to FIG. 6A, the loop buffer 750 stores and holds instructions that are executed during a loop such as instructions 604 and 606 for the outer loop 601 or instructions 605 for the inner loop 602.

Referring again to FIG. 7, each of the blocks 708, 808, and 812 in the unified pipeline controller 304 have control logic to control the instruction fetching and loop buffering for the signal processing units 300 of the core processor 200. The RISC control unit 302 signals to the F0 Fetch control stage 708 to fetch a new instruction. F0 Fetch control stage 708 generates an address on the address bus 702 coupled into the program memory 204 to address a memory location of a new instruction. The instruction is signaled onto the instruction bus 704 from the program memory 204 and is coupled into the loop buffer 750 of the F1 fetch control stage 750. The loop buffer 750 momentarily stores the instruction unless a loop is encountered which can be completely stored therein.

The loop buffer 750 is a first in first out (FIFO) type of buffer. That is, the first instruction stored in the FIFO represents the first instruction output which is executed. If a loop is not being executed, the instructions fall out of the loop buffer 750 and are overwritten by the next instruction. If the loop buffer 750 is operating in a loop, the instructions circulate within the loop buffer 750 from the first instruction within the loop (the "first loop instruction") to the last instruction within the loop (the "last loop instruction"). The depth N of the loop buffer 750 is coordinated with the design of the pipeline architecture of the signal processing units and the instruction set architecture. The deeper the loop buffer 750, the larger the value of N, the more complicated the pipeline and instruction set architecture. In the preferred embodiment, the loop buffer 750 has a depth N of four to hold four dyadic DSP instructions of a loop. Four dyadic DSP instructions are the equivalent of up to eight prior art DSP instructions which satisfies a majority of DSP program loops while maintaining reasonable complexity in the pipeline architecture and the instruction set architecture.

The loop buffer 750 differs from cache memory, which are associated with microprocessors. The loop buffer stores instructions of a program loop ("looping instructions") in contrast to a cache memory that typically stores a quantity of program instructions regardless of their function or repetitive nature. To accomplish the storage of loop instructions, as instructions are fetched from program memory 204, they are stored in the loop buffer and executed. The loop buffer 750 continues to store instructions read from program memory 204 in a FIFO manner until receiving a loop buffer cycle (LBC) signal 755 indicating that one complete loop of instructions has been executed and stored in the loop buffer 750. After storing a complete loop of instructions in the loop buffer 750, there is no need to fetch the same instructions over again to repeat the instructions. Upon receiving the LBC signal 755, instead of fetching the same instructions within the loop from program memory 204, the loop buffer is used to repeatedly output each instruction stored therein in a circular fashion in order to repeat executing the instructions within the sequence of the loop.

The loop buffer cycle signal LBC 755 is generated by the control logic within the D0 decoding stage 812. The loop buffer cycle signal LBC 755 couples to the F1 fetch control stage 808 and the F0 fetch control stage 708. The LBC 755 signals to the F0 fetch control stage 708 that additional instructions need not be fetched while executing the loop. In response the F0 fetch control stage remains idle such that power is conserved by avoiding the fetching of additional instructions. The control logic within the F1 fetch control stage 808 causes the loop buffer 750 to circulate its instruction output provided to the D0 decoding stage 812 in response to the loop buffer cycle signal 755. Upon completion of the loop, the loop buffer cycle signal 755 is deasserted and the loop buffer returns to processing standard instructions until another loop is to be processed.

In order to generate the loop buffer cycle signal 755, the first loop instruction that starts the loop needs to be ascertained and the total number of instructions or the last loop instruction needs to be determined. Additionally, the number of instructions in the loop, that is the loop size, cannot exceed the depth N of the loop buffer 750. In order to disable the loop buffer cycle signal 755, the number of times the loop is to be repeated needs to be determined.

The first loop instruction that starts a loop can easily be determined from a loop control instruction that sets up the loop. Loop control instructions can set up a single loop or one or more nested loops. In the preferred embodiment a single nested loop is used for simplicity. The loop control instructions are LOOP and LOOPi of FIG. 6I for a single loop and DLOOP and DLOOPi of FIG. 6J for a nested loop or dual loops. The LOOPi and DLOOPi instructions provide the loop values indirectly by pointing to registers that hold the appropriate values. The loop control instruction indicates how many instructions away does the first instruction of the loop begin in the instructions that follow. In the present invention, the number of instructions that follows is three or more. The loop control instruction additionally provides the size (i.e., the number of instructions) of the loop. For a nested loop, the loop control instruction (DLOOP or DLOOPi) indicates how many instructions away does the nested loop begin in the instructions that follow. If an entire nested loop can not fit into the loop buffer, only the inner loops that do fit are stored in the loop buffer while they are being executed. While the nesting can be N loops, in the preferred embodiment, the nesting is two. Upon receipt of the loop control instruction a loop status register is set up. The loop status register includes a loop active flag, an outer loop size, an inner loop size, outer loop counter value, and inner loop count value. Control logic compares the value of the loop size from the loop status register with the depth N of the loop buffer 750. If the size of the loop is less than or equal to the depth N, when the last instruction of the loop has been executed for the first time (i.e. the first pass through the loop), the loop buffer cycle signal 755 can be asserted such that instructions are read from the loop buffer 750 thereafter and decoded by the D0 decoder 812. The loop control instruction also includes information regarding the number of times a loop is to be repeated. The control logic of the D0 decoder 812 includes a counter to count the number of times the loop of instructions has been executed. Upon the count value reaching a number representing the number of times the loop was to be repeated, the loop buffer cycle signal 755 is deasserted so that instructions are once again fetched from program memory 204 for execution.

The preferred embodiments of the present invention are thus described. As those of ordinary skill will recognize, the present invention has many advantages. One advantage of the present invention is that power consumption is reduced when executing instructions within loops.

While the present invention has been described in particular embodiments, it may be implemented in hardware, software, firmware or a combination thereof and utilized in systems, subsystems, components or sub-components thereof. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information.

Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. In any case, the present invention should not be construed as limited by such embodiments, but rather construed according to the claims that follow below.

What is claimed is:

1. A signal processor to process digital signals, the signal processor comprising:
    data memory to store data;
    program memory to store at least one single instruction, the at least one single instruction being one of a digital signal processing (DSP) instruction or a control instruction; and
    a core processor including
        at least one signal processing unit to execute the digital signal processing instruction,
        a reduced instruction set computer (RISC) control unit, the RISC control unit to control the flow of operands and results between the at least one signal processing unit and the data memory, and
        a unified RISC/DSP pipeline controller coupled to the program memory, the RISC control unit, and the at least one signal processing unit, the unified pipeline controller to control the execution of the control instruction or the digital signal processing instruction.

2. The signal processor of claim 1, wherein,
    the control instruction is executed within a shared portion of the unified pipeline controller and the digital signal processing instruction is executed within the shared portion of the unified pipeline controller and a second DSP portion of the unified pipeline controller.

3. The signal processor of claim 1, wherein, the unified pipeline controller includes a fetch control stage to generate addresses to couple to the program memory to read the digital signal processing instruction or the control instruction.

4. The signal processor of claim 1, wherein, the unified pipeline controller includes a decoder stage to decode the digital signal processing instruction or the control instruction.

5. The signal processor of claim 4, wherein, the decoder stage generates a memory address for the digital signal processing instruction or performs a control operation for the control instruction.

6. The signal processor of claim 1, wherein, the unified pipeline controller includes a memory stage to provide memory access for the digital signal processing instruction or to update registers or data memory for the control instruction.

7. The signal processor of claim 1, wherein, the unified pipeline controller includes a plurality of execution stages to provide digital signal processing control signals to the at least one single processing unit to control the execution of the digital signal processing instruction by the at least one signal processing unit.

8. The signal processor of claim 1, wherein, the unified pipeline controller includes a write back stage to write back data to data memory after execution of the digital signal processing instruction.

9. The signal processor of claim 1, wherein, the single instruction is designated as a digital signal processing instruction by a single bit set within the single instruction.

10. The signal processor of claim 1, wherein, the single instruction is designated as a control instruction by a single bit set within the single instruction.

11. The signal processor of claim 10, wherein, the digital signal processing instruction is a dyadic instruction having a main operation and a sub operation.

12. The signal processor of claim 11, wherein, the main operation of the digital signal processing instruction is one of the set of multiplication, addition, comparison with a minimum or maximum value, and no operation.

13. The signal processor of claim 12, wherein, the sub operation of the digital signal processing instruction is one of the set of multiplication, addition, comparison with a minimum or maximum value, and no operation which differs from the main operation.

14. The signal processor of claim 1, wherein, the unified pipeline controller includes a loop buffer to control the execution of the digital signal processing instruction within a loop, the unified pipeline controller to read the digital signal processing instruction from the program memory to store it within the loop buffer, the at least one signal processing unit to execute the digital signal processing instruction within the loop from the loop buffer without re-reading it from the program memory during execution.

15. A method of increasing the efficiency of the execution of digital signal processing (DSP) instructions and reduced instruction set computer (RISC) control instructions, the method comprising:
    fetching at least one single instruction from a program memory;
    reading the at least one single instruction, the at least one single instruction being one of a DSP instruction or a RISC control instruction;
    generating DSP control signals to control the execution of the DSP instruction by at least one signal processing unit;
    controlling the flow of operands and results between the at least one signal processing unit and a data memory using a reduced instruction set computer (RISC) control unit; and
    generating RISC control signals to control the execution of the RISC control instruction.

16. The method of claim 15, wherein, a unified RISC/DSP pipeline controller is used to generate the DSP control signals or the RISC control signals to control the execution of the DSP instruction or the RISC control instruction, respectively.

17. The method of claim 16, wherein, the RISC control instruction is executed within a shared portion of the unified pipeline controller and the DSP instruction is executed within the shared portion of the unified pipeline controller and a second DSP portion of the unified pipeline controller.

18. The method of claim 15, further comprising, decoding the DSP instruction or the RISC control instruction.

19. The method of claim 18, wherein, decoding the DSP instruction includes generating a memory address for the DSP instruction.

20. The method of claim 15, further comprising, accessing the data memory for the DSP instruction.

21. The method of claim 15, further comprising, updating registers or data memory for the RISC control instruction.

22. The method of claim 15, further comprising, writing back data to data memory after execution of the DSP instruction.

23. The method of claim 15, wherein, the single instruction is designated as a DSP instruction by a single bit set within the single instruction.

24. The method of claim 15, wherein, the single instruction is designated as a RISC control instruction by a single bit set within the single instruction.

25. The method of claim 15, wherein, the DSP instruction is a dyadic instruction having a main operation and a sub operation.

26. The method of claim 15, wherein, the main operation of the DSP instruction is one of the set of multiplication, addition, comparison with a minimum or maximum value, and no operation.

27. The method of claim 15, wherein, the sub operation of the DSP instruction is one of the set of multiplication, addition, comparison with a minimum or maximum value, and no operation which differs from the main operation.

28. The method of claim 16, wherein, the unified pipeline controller includes a loop buffer to control the execution of the DSP instruction within a loop, the unified pipeline controller to read the DSP instruction from the program memory to store it within the loop buffer, the at least one signal processing unit to execute the DSP instruction within the loop from the loop buffer without re-reading it from the program memory during execution.

29. A unified RISC/DSP pipeline controller to increase the efficiency of the execution of digital signal processing (DSP) instructions and reduced instruction set computer (RISC) control instructions, the unified pipeline controller comprising:
  a fetch control stage to generate addresses coupled to a program memory to read a single instruction, the program memory to store at least one single instruction being one of a DSP instruction or a RISC control instruction;
  a decoder stage to decode the DSP instruction or the RISC control instruction; and
  a plurality of execution stages coupled to at least one signal processing unit to provide DSP control signals to the at least one signal processing unit to control the execution of the DSP instruction by the at least one signal processing unit.

30. The RISC/DSP unified pipeline controller of claim 29, wherein, the decoder stage is coupled to the at least one signal processing unit and to a reduced instruction set computer (RISC) control unit, the RISC control unit to control the flow of operands and results between the at least one signal processing unit and a data memory.

31. The unified RISC/DSP pipeline controller of claim 30, wherein, the decoder stage generates a memory address for the DSP instruction or performs a RISC control operation for the RISC control instruction.

32. The unified RISC/DSP pipeline controller of claim 29, further comprising, a memory stage coupled to the at least one signal processing unit and to the RISC control unit to provide memory access for the DSP instruction or to update registers or a data memory for the RISC control instruction.

33. The unified RISC/DSP pipeline controller of claim 29, further comprising, a write back stage coupled to the at least signal processing unit to write back data to a data memory after execution of the DSP instruction.

34. The unified RISC/DSP pipeline controller of claim 29, wherein, the single instruction is designated as a DSP instruction by a single bit set within the single instruction.

35. The unified RISC/DSP pipeline controller of claim 29, wherein, the single instruction is designated as a RISC control instruction by a single bit set within the single instruction.

36. The unified RISC/DSP pipeline controller of claim 35, wherein, the DSP instruction is a dyadic instruction having a main operation and a sub operation.

37. The unified RISC/DSP pipeline controller of claim 36, wherein, the main operation of the DSP instruction is one of the set of multiplication, addition, comparison with a minimum or maximum value, and no operation.

38. The unified RISC/DSP pipeline controller of claim 37, wherein, the sub operation of the DSP instruction is one of the set of multiplication, addition, comparison with a minimum or maximum value, and no operation which differs from the main operation.

39. The unified RISC/DSP pipeline controller of claim 29, wherein, the unified pipeline controller includes a loop buffer to control the execution of the DSP instruction within a loop, the unified pipeline controller to read the DSP instruction from the program memory to store it within the loop buffer, the at least one signal processing unit to execute the DSP instruction within the loop from the loop buffer without re-reading it from the program memory during execution.

* * * * *